US012732394B2

(12) United States Patent
Zhang et al.

(10) Patent No.: US 12,732,394 B2
(45) Date of Patent: Sep. 8, 2026

(54) PROCESSING SYSTEM AND INSTRUCTION TRANSMISSION METHOD

(71) Applicant: Alibaba (China) Co., Ltd., Hangzhou (CN)

(72) Inventors: Zhe Zhang, Beijing (CN); Shuangchen Li, Sunnyvale, CA (US); Linyong Huang, Shanghai (CN); Hongzhong Zheng, Shanghai (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 378 days.

(21) Appl. No.: 18/436,658

(22) Filed: Feb. 8, 2024

(65) Prior Publication Data

US 2024/0267256 A1 Aug. 8, 2024

(30) Foreign Application Priority Data

Feb. 8, 2023 (CN) ......................... 202310119813.1

(51) Int. Cl.
*H04L 12/40* (2006.01)

(52) U.S. Cl.
CPC .. *H04L 12/40013* (2013.01); *H04L 12/40032* (2013.01)

(58) Field of Classification Search
CPC ........ H04L 12/40013; H04L 12/40032; Y02D 10/00
See application file for complete search history.

(56) References Cited

U.S. PATENT DOCUMENTS

2004/0257370 A1 12/2004 Lippincott et al.
2014/0195784 A1* 7/2014 Ivanov .................. G06F 9/3877 712/225
2023/0032236 A1* 2/2023 Sankaran .............. G06F 3/0679
2023/0393851 A1* 12/2023 Wang .................. G06F 9/30181
2024/0054011 A1* 2/2024 Sankaran ................ G06F 9/541
2024/0394057 A1* 11/2024 Zhang ................. G06F 9/30036

FOREIGN PATENT DOCUMENTS

CN 1140857 A 1/1997
RU 2686017 C1 4/2019
WO 2022133718 A1 6/2022

OTHER PUBLICATIONS

Office Action issued in corresponding Chinese Application No. 202310119813.1 on Jul. 23, 2025, (17 pages).

* cited by examiner

*Primary Examiner* — Gary Mui
*Assistant Examiner* — Yewon Kim
(74) *Attorney, Agent, or Firm* — Finnegan, Henderson, Farabow, Garrett & Dunner, LLP

(57) ABSTRACT

Embodiments of this disclosure provide a processing system and an instruction transmission method. The instruction transmission method includes: receiving a processor instruction from a main processor communicatively coupled to an interface unit; generating an accelerator instruction corresponding to the processor instruction; determining a target accelerator corresponding to the accelerator instruction from a plurality of accelerators communicatively coupled to a first bus network; and transmitting the accelerator instruction to the target accelerator through the first bus network.

14 Claims, 14 Drawing Sheets

PROCESSING SYSTEM AND INSTRUCTION TRANSMISSION METHOD

CROSS-REFERENCE TO RELATED APPLICATIONS

The disclosure claims the benefit of priority to Chinese Application No. 202310119813.1, filed on Feb. 8, 2023, which is incorporated herein by reference in its entirety.

TECHNICAL FIELD

Embodiments of this disclosure relate to the technical field of computers, and in particular, to processing systems and instruction transmission methods.

BACKGROUND

An accelerator is a device designed to process specific compute-intensive tasks. A main processor of a processing system usually offloads the computing tasks to the accelerator, so that the main processor may perform other tasks. A graphics accelerator may be the most famous accelerator, because the graphics accelerator is suitable for almost all current-generation personal computers. In addition, many different types of accelerators also exist.

Conventionally, the accelerator is connected to and communicates with the main processor through an external bus (for example, a peripheral component interconnection (PCIe) bus). Recently, an accelerator called Data Streaming Accelerator (DSA) is integrated with the processing system on a same chip.

As machine learning models and artificial intelligence learning tasks become increasingly complex, a computing capability configuration solution for a current processing system on which an accelerator and a processor are integrated still needs to be improved.

SUMMARY

The disclosed embodiments of this disclosure provide a processing system, an instruction transmission method, an electronic device, and a storage medium, to at least partially resolve the above problem.

According to some embodiments of this disclosure, there is provided a processing system. The processing system includes: at least one main processor configured to output a processor instruction; at least one interface unit arranged corresponding to the at least one main processor and including: an interface front end communicatively coupled to the main processor and configured to receive the processor instruction, to generate an accelerator instruction corresponding to the processor instruction, and to transmit the accelerator instruction; and an interface register configured to receive the transmitted accelerator instruction and to forward the accelerator instruction, or to receive a response to the accelerator instruction; at least one accelerator configured to process the forwarded accelerator instruction to obtain the response to the accelerator instruction; and a first bus network communicatively coupled between the at least one interface unit and the at least one accelerator and configured to transmit the accelerator instruction to a corresponding accelerator of the at least one accelerator, or to transmit the response to the accelerator instruction to the interface register.

In some embodiments of the present disclosure, the first bus network includes at least one bus front end and at least one bus back end, the at least one bus front end is arranged corresponding to at least one interface register, and the at least one bus back end is arranged corresponding to the at least one accelerator. The first bus network is configured to transmit the accelerator instruction to the corresponding accelerator or to transmit the response to the accelerator instruction to a corresponding interface register of the at least one accelerator through routing between the at least one bus front end and the at least one bus back end.

In some embodiments of the present disclosure, the first bus network includes an exchanger, and the exchanger is arranged between the at least one bus front end and the at least one bus back end, and is configured to route the accelerator instruction or the response to the accelerator instruction between the at least one bus front end and the at least one bus back end.

In some embodiments of the present disclosure, the first bus network includes a first subnetwork and a second subnetwork, the at least one main processor includes a first main processor and a second main processor, and the at least one interface unit includes a first interface unit arranged corresponding to the first main processor and a second interface unit arranged corresponding to the second main processor. An interface register of the first interface unit is communicatively coupled to the at least one accelerator through the first subnetwork, and an interface register of the second interface unit is communicatively coupled to the at least one accelerator through the second subnetwork.

In some embodiments of the present disclosure, the first bus network includes a first subnetwork and a second subnetwork, and the at least one accelerator includes a first accelerator and a second accelerator. The interface register is communicatively coupled to the first accelerator through the first subnetwork, and is communicatively coupled to the second accelerator through the second subnetwork.

In some embodiments of the present disclosure, the at least one main processor includes a plurality of main processors, the at least one accelerator includes a plurality of accelerators, and the first bus network includes a plurality of subnetworks. The plurality of main processors, the plurality of accelerators, and the plurality of subnetworks correspond to each other respectively, and each of the plurality of main processors is communicatively coupled to the corresponding accelerator through a corresponding subnetwork of the plurality of subnetworks.

According to some embodiments of this disclosure, there is provided a processing system. The processing system includes: a first main processor configured to output a first processor instruction; a first interface unit arranged corresponding to the first main processor and including: a first interface front end communicatively coupled to the first main processor and configured to receive the first processor instruction, to generate a transmission instruction corresponding to the first processor instruction, and to transmit the transmission instruction; and a first interface register configured to: receive the transmitted transmission instruction and to forward the transmission instruction, or to receive a response to the transmission instruction; a second main processor configured to at least process a second processor instruction to obtain a processing result of the second processor instruction; a second interface unit arranged corresponding to the second main processor and including: a second interface register configured to receive the transmitted transmission instruction and to forward the transmission instruction, or to receive the response to the transmission instruction; and a second interface front end communicatively coupled to the second main processor and configured to receive the transmission instruction and to generate a second processor instruction corresponding to the transmission instruction, or to generate the response to the transmission instruction based on the processing result of the second processor instruction; and a third bus network communicatively coupled between the first main processor and the second main processor and configured to transmit the transmission instruction from the first main processor to the second main processor, or to transmit the response to the transmission instruction from the second main processor to the first main processor.

In some embodiments of the present disclosure, the first main processor is further configured to output the second processor instruction. The first interface front end is further configured to receive the second processor instruction, to generate a second accelerator instruction corresponding to the second processor instruction, and to transmit the second accelerator instruction. The first interface register is further configured to receive the transmitted second accelerator instruction and to forward the second accelerator instruction, or to receive a response to the second accelerator instruction. The processing system further includes: at least one accelerator configured to process the forwarded second accelerator instruction to obtain the response to the second accelerator instruction; and a first bus network communicatively coupled between the first interface unit and the at least one accelerator and configured to transmit the second accelerator instruction to a corresponding accelerator, or to transmit the response to the second accelerator instruction to the first interface register.

In some embodiments of the present disclosure, the second main processor is further configured to output a third processor instruction. The second interface front end is further configured to receive the third processor instruction, to generate a third accelerator instruction corresponding to the third processor instruction, and to transmit the third accelerator instruction. The second interface register is further configured to receive the transmitted third accelerator instruction and to forward the third accelerator instruction, or to receive a response to the third accelerator instruction. The processing system further includes: at least one accelerator configured to process the forwarded third accelerator instruction to obtain the response to the third accelerator instruction; and a fourth bus network communicatively coupled between the second interface unit and the at least one accelerator and configured to transmit the third accelerator instruction to a corresponding accelerator, or to transmit the response to the third accelerator instruction to the second interface register.

In some embodiments of the present disclosure, the first main processor is a scheduling processor, and the second main processor is an execution processor.

According to some embodiments of this disclosure, there is provided an instruction transmission method. The instruction transmission method is applicable to an interface unit and includes: receiving a processor instruction from a main processor communicatively coupled to the interface unit; generating an accelerator instruction corresponding to the processor instruction; determining a target accelerator corresponding to the accelerator instruction from a plurality of accelerators communicatively coupled to a first bus network; and transmitting the accelerator instruction to the target accelerator through the first bus network.

In some embodiments of the present disclosure, determining the target accelerator corresponding to the accelerator instruction from the plurality of accelerators communicatively coupled to the first bus network includes: determining a quantity of instructions to be processed of each of the plurality of accelerators communicatively coupled to the first bus network; and determining, from the plurality of accelerators, a target accelerator of which a quantity of instructions to be processed is less than a quantity of instructions to be processed of other accelerators.

In some embodiments of the present disclosure, transmitting the accelerator instruction to the target accelerator through the first bus network includes: transmitting the accelerator instruction and an identifier of the target accelerator to an exchanger of the first bus network through a bus front end of the first bus network corresponding to the interface unit, where the identifier instructs the exchanger to locate the target accelerator; and forwarding the accelerator instruction to the target accelerator.

In some embodiments of the present disclosure, the method further includes: receiving, through the first bus network, a processing response to the accelerator instruction returned by the target accelerator.

According to some embodiments of this disclosure, there is provided an electronic device. The electronic device includes the processing system as described herein, a memory, a communication interface, and a fifth bus network. The processing system, the memory, and the communication interface are configured to complete communication with each other through the fifth bus network. The memory is configured to store at least one executable instruction of a computer program. The main processor of the processing system is configured to generate a processor instruction based on the at least one executable instruction.

According to some embodiments of this disclosure, there is provided a non-transitory computer-readable storage medium. The non-transitory computer-readable storage medium stores instructions, when executed by the processing system as described herein, cause the processing system to perform any of the methods described herein.

BRIEF DESCRIPTION OF THE DRAWINGS

The accompanying drawings described herein are used for providing a further understanding of the present disclosure, and forming a part of the present disclosure. Exemplary examples of the present disclosure and descriptions thereof are used for explaining the present disclosure, but do not constitute any inappropriate limitation to the present disclosure. In the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

In some of the disclosed embodiments, the processing system is designed such that the interface unit(s) correspond with the main processor(s), enabling seamless conversion of instructions between the two through the interface front end. The interface register is then configured to transmit the converted instructions, facilitating effective management and queuing of instructions, and ensuring their suitability for processing by the accelerator. Additionally, a first bus network connects the interface unit(s) to the accelerator(s), transmitting accelerator instructions or responses to the corresponding interface register. This flexibility enables a variable number of accelerators to be connected to main processors via buses, accommodating numerous machine learning models and AI learning tasks, leading to improved configurations of computing capabilities.

Figure 1:
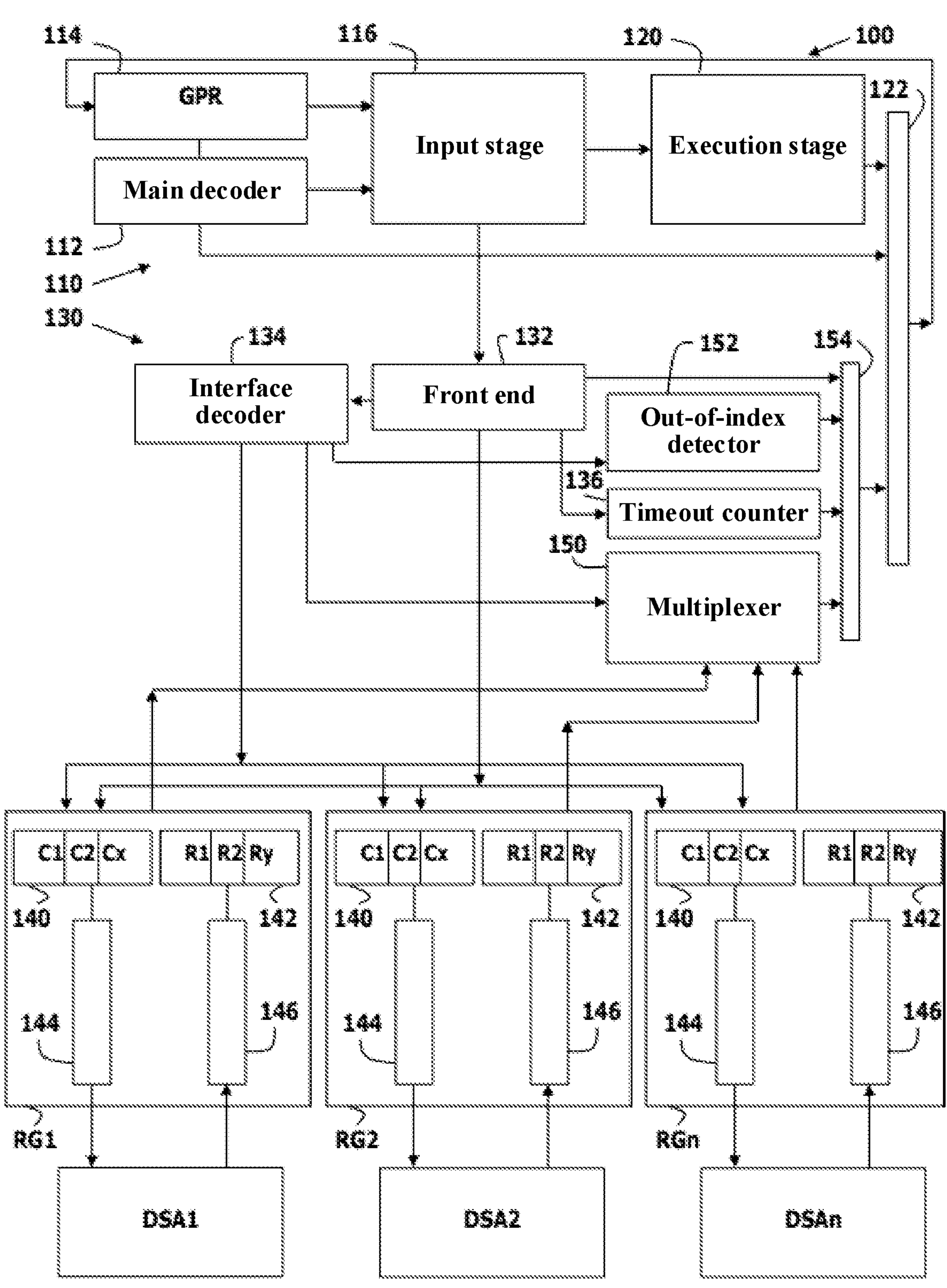
FIG. 1 is a schematic block diagram illustrating an example processing system according to some embodiments of the present disclosure.

FIG. 1 is a schematic block diagram illustrating an example processing system 100 according to some embodiments of the present disclosure. As shown in FIG. 1, processing system 100 includes a main processor 110. Main processor 110 includes a main decoder 112, a multiword general-purpose register (GPR) 114 connected to main decoder 112, and an input stage 116 connected to main decoder 112 and GPR 114. In addition, main processor 110 includes an execution stage 120 connected to input stage 116 and a switch 122 connected to main decoder 112, execution stage 120, and GPR 114.

Main decoder 112, GPR 114, input stage 116, and execution stage 120 can be common conventional elements in main processors such as an RISC-V processor. For example, a GPR in the RISC-V processor has 32 memory locations, each having a length of 32 bits. In addition, the execution stage usually includes an arithmetic logic unit (ALU), a multiplier, and a load storage unit (LSU).

As shown in FIG. 1, processing system 100 further includes an interface unit 130 connected to input stage 116 and switch 122 of main processor 110. Interface unit 130 includes a front end 132 connected to input stage 116, an interface decoder 134 connected to front end 132, and a timeout counter 136 connected to front end 132.

Interface unit 130 further includes a plurality of interface registers RG1-RGn, each being connected to front end 132 and interface decoder 134. Each interface register RG has a command register 140 having a plurality of 32-bit command storage units C1-Cx and a response register 142 having a plurality of 32-bit response storage locations R1-Ry.

Although command registers 140 are shown as having a same quantity of command storage units x in FIG. 1, command registers 140 may alternately have different quantities of command storage units. Similarly, response registers 142 are shown as having a same quantity of response storage locations y in FIG. 1. Nevertheless, because quantities of response storage locations can be different, response registers 142 may alternately have different quantities of response storage locations.

In addition, each of the interface registers RG has a first-in first-out (FIFO) output queue 144 connected to command register 140 and a FIFO input queue 146 connected to response register 142. Each row in FIFO output queue 144 has the same quantity of memory locations as command register 140. Similarly, each row in FIFO input queue 146 has the same quantity of memory locations as response register 142.

In addition, interface unit 130 includes an output multiplexer 150 connected to interface decoder 134 and each interface register RG. In some embodiments, interface unit 130 may include an out-of-index detector 152 connected to interface decoder 134. In addition, interface unit 130 may further include a switch 154 connected to front end 132. The switch selectively connects timeout counter 136, multiplexer 150, or out-of-index detector 152 (when used) to switch 122.

As shown in FIG. 1, processing system 100 further includes a plurality of DSAs (i.e., DSA1-DSAn) connected to output queues 144 and input queues 146 of the interface registers RG1-RGn. The DSAs may be implemented by using various conventional accelerators, such as videos, vision, artificial intelligence, vectors, and general matrix multiplication. In addition, the DSAs may run at any desired clock frequency.

As described in more details below, many new instructions, including an accelerator write instruction, a push ready instruction, a push instruction, a read ready instruction, a pop instruction, and a read instruction, are added to a conventional instruction set architecture (ISA). For example, RISC-VISA has four basic instruction sets (RV32I, RV32E, RV64I, RV128I) and some extended instruction sets (for example, M, A, F, D, G, Q, C, L, B, J, T, P, V, N, H) that may be added to the basic instruction sets to achieve a specific goal. In some embodiments, the RISC-VISA is modified in such a way that the new instructions are included in a customized extended set.

In addition, the new instructions use the same instruction format as another instruction in the ISA. For example, the RISC-VISA has six instruction formats. One of the six formats is an I-type format, which has a seven-bit operation code field, a five-bit target field that identifies a target location in a general-purpose register (GPR), a three-bit function field that identifies an operation, a 5-bit operand field that identifies a position of an operand in a GPR, and a 12-bit immediate field.

Figure 2:
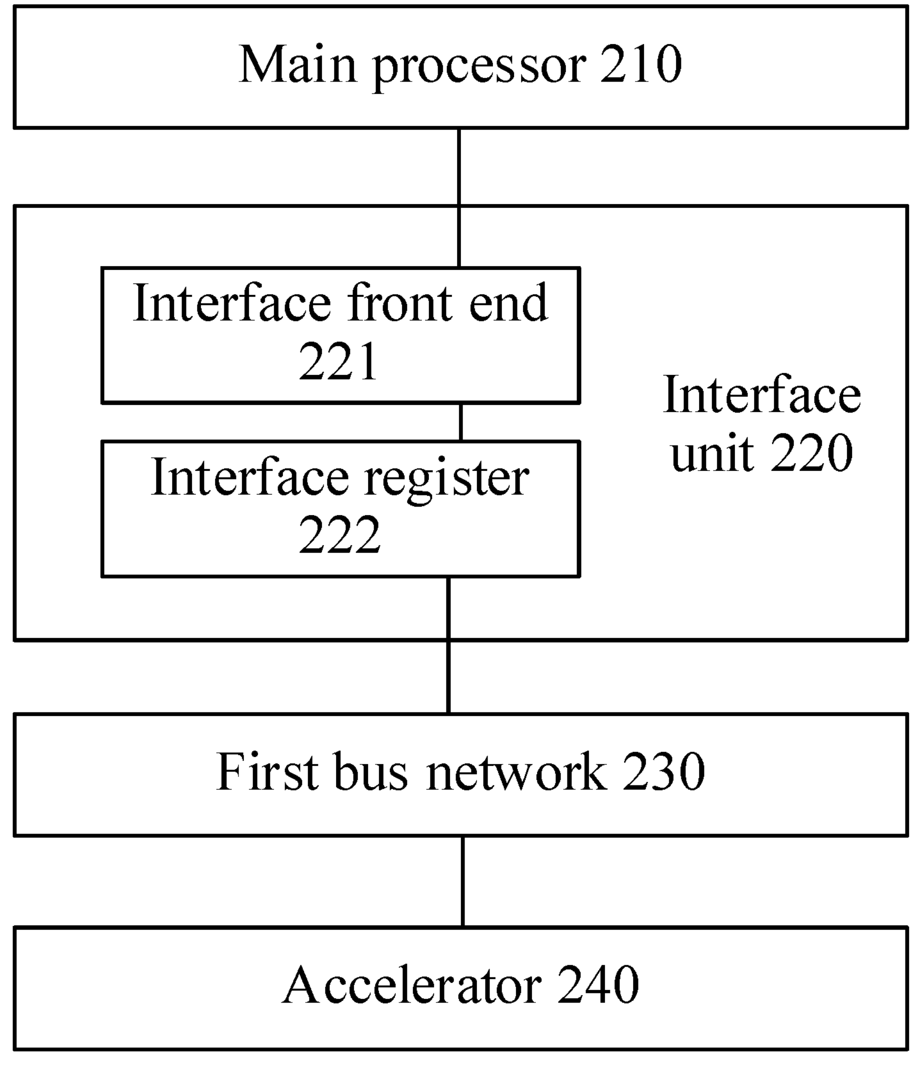
FIG. 2 is a schematic block diagram illustrating an example processing system according to some embodiments of the present disclosure.

FIG. 2 is a schematic block diagram illustrating an example processing system 200 according to some embodiments of the present disclosure. Processing system 200, in some embodiments of the present disclosure, includes at least one main processor 210, at least one interface unit 220, a first bus network 230, and at least one accelerator 240. For example, at least one interface unit 220 may be implemented as interface unit 130 in FIG. 1, and at least one main processor 210 may be implemented as main processor 110 in FIG. 1.

At least one main processor 210 is configured to output a processor instruction.

At least one interface unit 220 is arranged corresponding to the at least one main processor. Interface unit 220 includes an interface front end 221 (for example, front end 132 in FIG. 1) and an interface register 222 (for example, the interface registers RG1-RGn in FIG. 1). For example, each interface unit includes at least one interface front end and at least one interface register.

Specifically, interface front end 221 is connected to main processor 210. Interface front end 221 is configured to receive the processor instruction, to generate an accelerator instruction corresponding to the processor instruction, and to transmit the accelerator instruction. Interface register 222 is configured to receive the transmitted accelerator instruction and to forward the accelerator instruction, or to receive a response to the accelerator instruction.

At least one accelerator 240 is configured to process the forwarded accelerator instruction to obtain the response to the accelerator instruction.

First bus network 230 is connected between at least one interface unit 220 and at least one accelerator 240, and is configured to transmit the accelerator instruction to a corresponding accelerator of at least one accelerator 240, or to transmit the response to the accelerator instruction to a corresponding interface register of interface register 222.

According to the processing system in some embodiments of this disclosure, the at least one interface unit is arranged corresponding to the at least one main processor, instruction conversion between the main processor and the accelerator is implemented through the interface front end, and the interface register is configured to forward the converted instruction, which facilitates queue management of the instructions, thereby obtaining, through the interface unit, instructions suitable for processing by the accelerator. In addition, the first bus network is connected between the at least one interface unit and the at least one accelerator, and is configured to transmit the accelerator instruction to the corresponding accelerator, or to transmit the response to the accelerator instruction to the corresponding interface register. Through the first bus network, a flexible quantity of accelerators may be connected to a flexible quantity of main processors through buses, so as to adapt to many types of machine learning models and artificial intelligence learning tasks. In this way, flexibility of computing capability configuration is improved.

In some embodiments, the interface unit may further include interface decoder 134 as shown in FIG. 1. One main processor may correspond to one or more interface units, and one interface unit may include one or more interface registers. Through a bus front end and a bus back end of the first bus network, each accelerator may correspond to at least one specific interface register, or each accelerator may correspond to each interface register.

In some embodiments, the first bus network includes at least one bus front end and at least one bus back end, the at least one bus front end is arranged corresponding to the at least one interface register, and the at least one bus back end is arranged corresponding to the at least one accelerator. The first bus network is configured to transmit the accelerator instruction to the corresponding accelerator or to transmit the response to the accelerator instruction to the corresponding interface register through routing between the at least one bus front end and the at least one bus back end.

FIGS. 3A, 3B, 3C, 3D and 3E are schematic block diagrams illustrating various variation examples of the processing system, according to the processing system shown in FIG. 2.

Figure 3A:
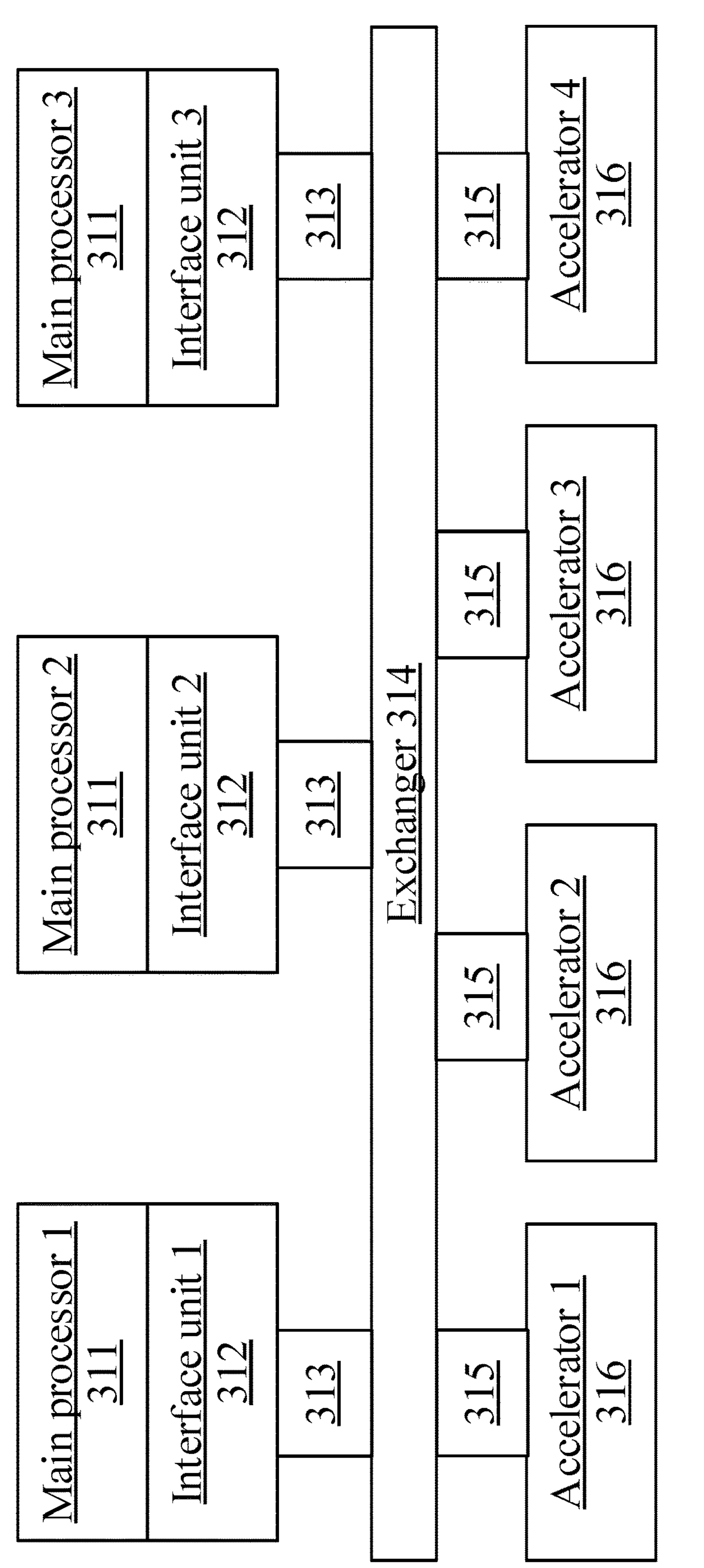
FIGS. 3A, 3B, 3C, 3D and 3E are schematic block diagrams illustrating various variation examples of the processing system, according to the processing system shown in FIG. 2.

Referring to FIG. 3A, at least one main processor 311 includes a main processor 1, a main processor 2, and a main processor 3. At least one interface unit 312 includes an interface unit 1, an interface unit 2, and an interface unit 3. At least one accelerator 316 includes an accelerator 1, an accelerator 2, an accelerator 3, and an accelerator 4.

At least one bus front end 313 includes three bus front ends 313 as shown in FIG. 3A, and at least one bus back end 315 includes four bus back ends 315 as shown. In some embodiments, an exchanger 314 is arranged between each bus front end 313 and each bus back end 315. The exchanger may be a so-called crossbar. Exchanger 314 is configured to route the accelerator instruction or the response to the accelerator instruction between the at least one bus front end and the at least one bus back end.

Specifically, each accelerator may correspond to each interface register through the exchanger of the first bus network.

Figure 3B:
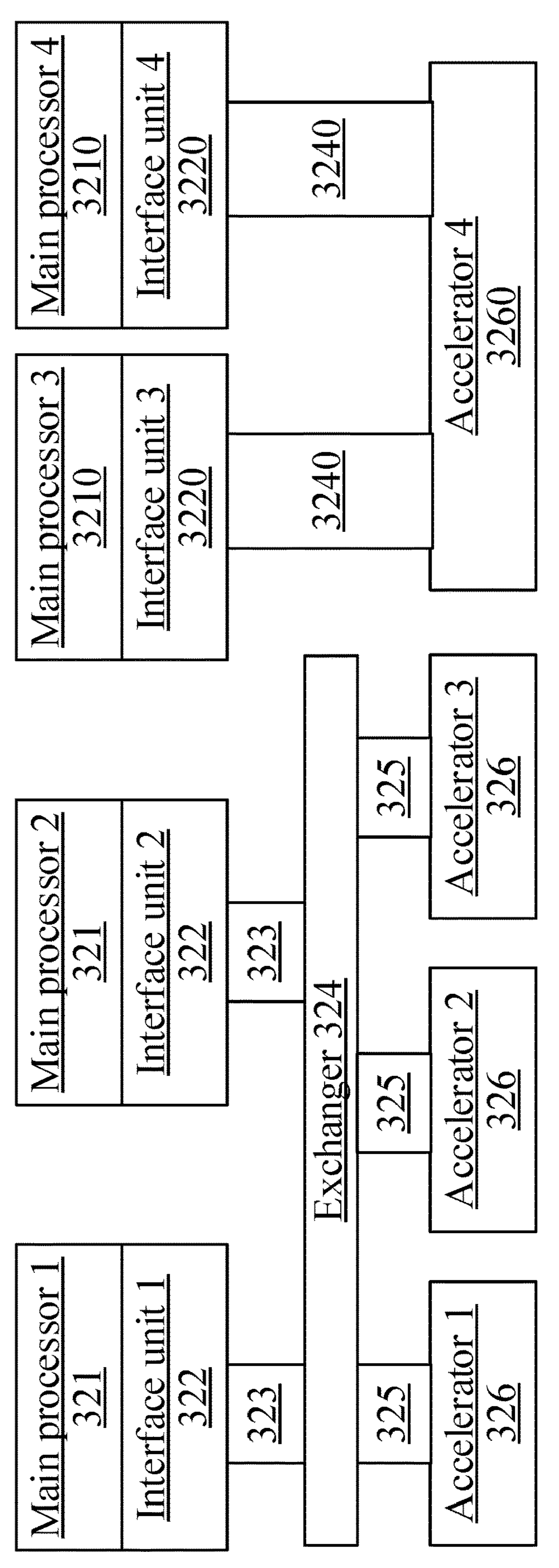

Referring to FIG. 3B, the at least one main processor includes a first main processor 321 and a second main processor 3210. First main processor 321 includes a main processor 1 and a main processor 2, and second main processor 3210 includes a main processor 3 and a main processor 4. The at least one interface unit includes a first interface unit 322 and a second interface unit 3220. First interface unit 322 includes an interface unit 1 and an interface unit 2, and second interface unit 3220 includes an interface unit 3 and an interface unit 4. The at least one accelerator includes a first accelerator 326 and a second accelerator 3260. First accelerator 326 includes an accelerator 1, an accelerator 2, and an accelerator 3, and second accelerator 3260 includes an accelerator 4.

In the first bus network that includes the exchanger, at least one bus front end 323 includes two bus front ends 323 as shown in FIG. 3B, and at least one bus back end 325 includes three bus back ends 325 as shown in FIG. 3B. In some embodiments, an exchanger 324 is arranged between each bus front end 323 and each bus back end 325. The exchanger may be a so-called crossbar. Exchanger 324 is configured to route the accelerator instruction or the response to the accelerator instruction between the at least one bus front end and the at least one bus back end. In addition, a second bus network 3240 that does not include the exchanger is connected between the second interface unit and the second accelerator.

Specifically, each accelerator may correspond to at least one specific interface registers through the second bus network. In some embodiments, interface unit 3 and interface unit 4 correspond to accelerator 4.

In general, the first bus network may include a first subnetwork and a second subnetwork, the at least one main processor may include the first main processor and the second main processor, the at least one interface unit may include the first interface unit arranged corresponding to the first main processor and the second interface unit arranged corresponding to the second main processor, an interface register of the first interface unit may be connected to the at least one accelerator through the first subnetwork, and an interface register of the second interface unit may be connected to the at least one accelerator through the second subnetwork. The first bus network may include the exchanger, and the second bus network may not include the exchangers. This may further improve flexibility of the architecture, so that the architecture more adapts to complex and varying AI models and tasks.

Figure 3C:
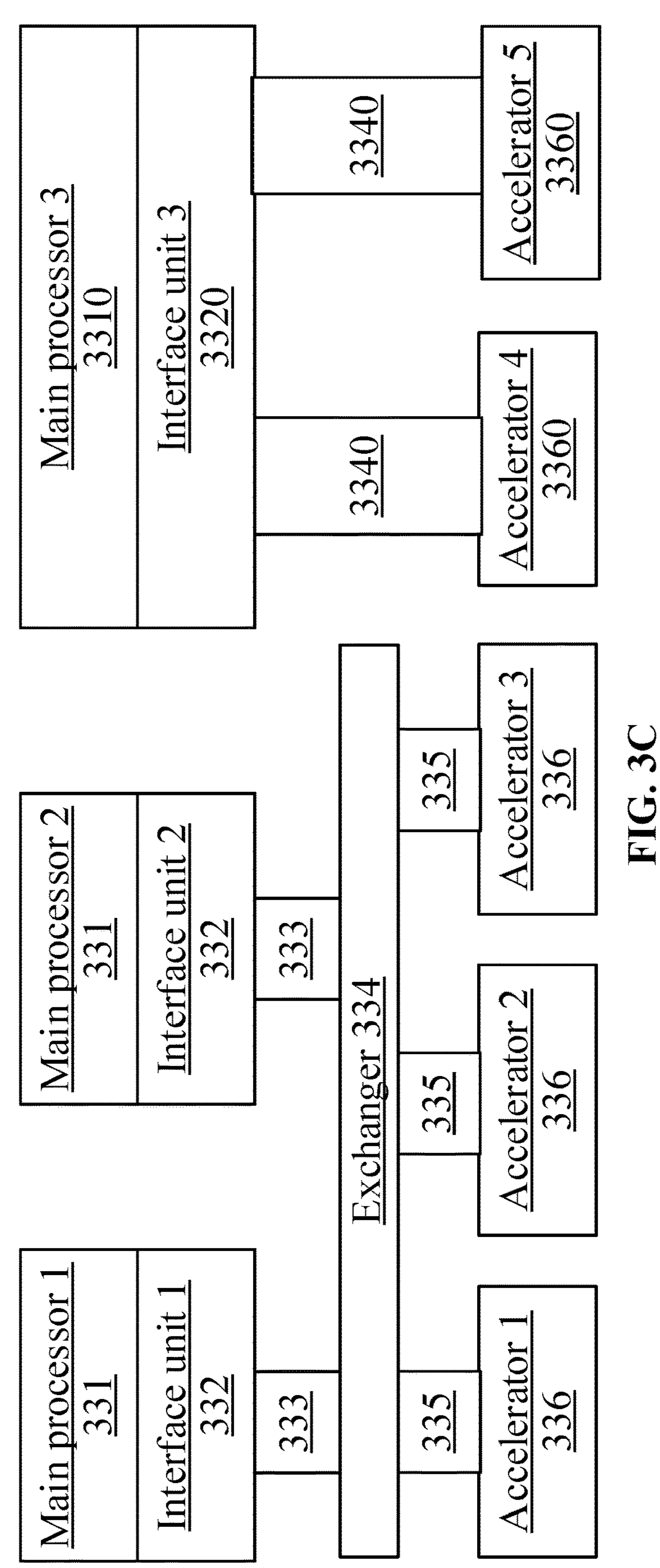

Referring to FIG. 3C, the at least one main processor includes a first main processor 331 and a second main processor 3310. First main processor 331 includes a main processor 1 and a main processor 2, and second main processor 3310 includes a main processor 3. The at least one interface unit includes a first interface unit 332 and a second interface unit 3320. First interface unit 332 includes an interface unit 1 and an interface unit 2, and second interface unit 3320 includes an interface unit 3. The at least one accelerator includes a first accelerator 336 and a second accelerator 3360. First accelerator 336 includes an accelerator 1, an accelerator 2, and an accelerator 3, and second accelerator 3360 includes an accelerator 4 and an accelerator 5.

In the first bus network that includes the exchanger, at least one bus front end 333 includes two bus front ends 333as shown in FIG. 3C, and at least one bus back end 335 includes three bus back ends 335 as shown in FIG. 3C. In some embodiments, an exchanger 334 is arranged between each bus front end 333 and each bus back end 335. The exchanger may be a so-called crossbar. Exchanger 334 is configured to route the accelerator instruction or the response to the accelerator instruction between the at least one bus front end and the at least one bus back end. In addition, a second bus network 3340 that does not include the exchanger is connected between the second interface unit and the second accelerator.

Specifically, a plurality of accelerators may correspond to one interface register through the second bus network. In some embodiments, interface unit 3 corresponds to accelerator 4 and accelerator 5.

Figure 3D:
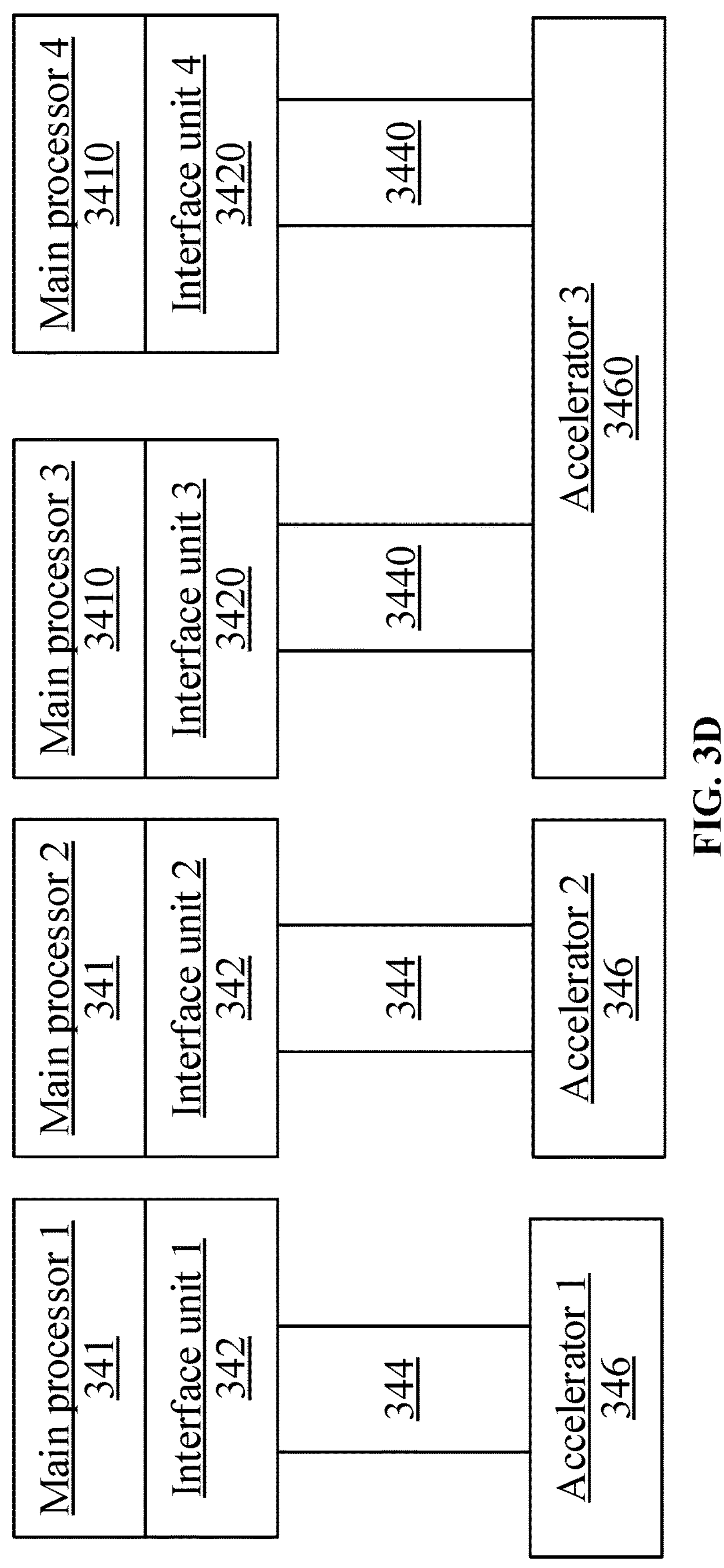

Referring to FIG. 3D, the at least one main processor includes a first main processor 341 and a second main processor 3410. First main processor 341 includes a main processor 1 and a main processor 2, and second main processor 3410 includes a main processor 3 and a main processor 4. The at least one interface unit includes a first interface unit 342 and a second interface unit 3420. First interface unit 342 includes an interface unit 1 and an interface unit 2, and second interface unit 3420 includes an interface unit 3 and an interface unit 4. The at least one accelerator includes a first accelerator 346 and a second accelerator 3460. First accelerator 346 includes an accelerator an accelerator 1, and an accelerator 2, and second accelerator 3460 includes an accelerator 3.

In addition, a first bus network 344 that does not include the exchanger is connected between the first interface unit and the first accelerator. Specifically, when the first bus network does not include the exchanger, a specific interface unit corresponds to a specific accelerator. That is to say, in some embodiments, the interface unit 1 corresponds to the accelerator 1, and the interface unit 2 corresponds to the accelerator 2.

A second bus network 3440 that does not include the exchanger is connected between the second interface unit and the second accelerator.

Figure 3E:
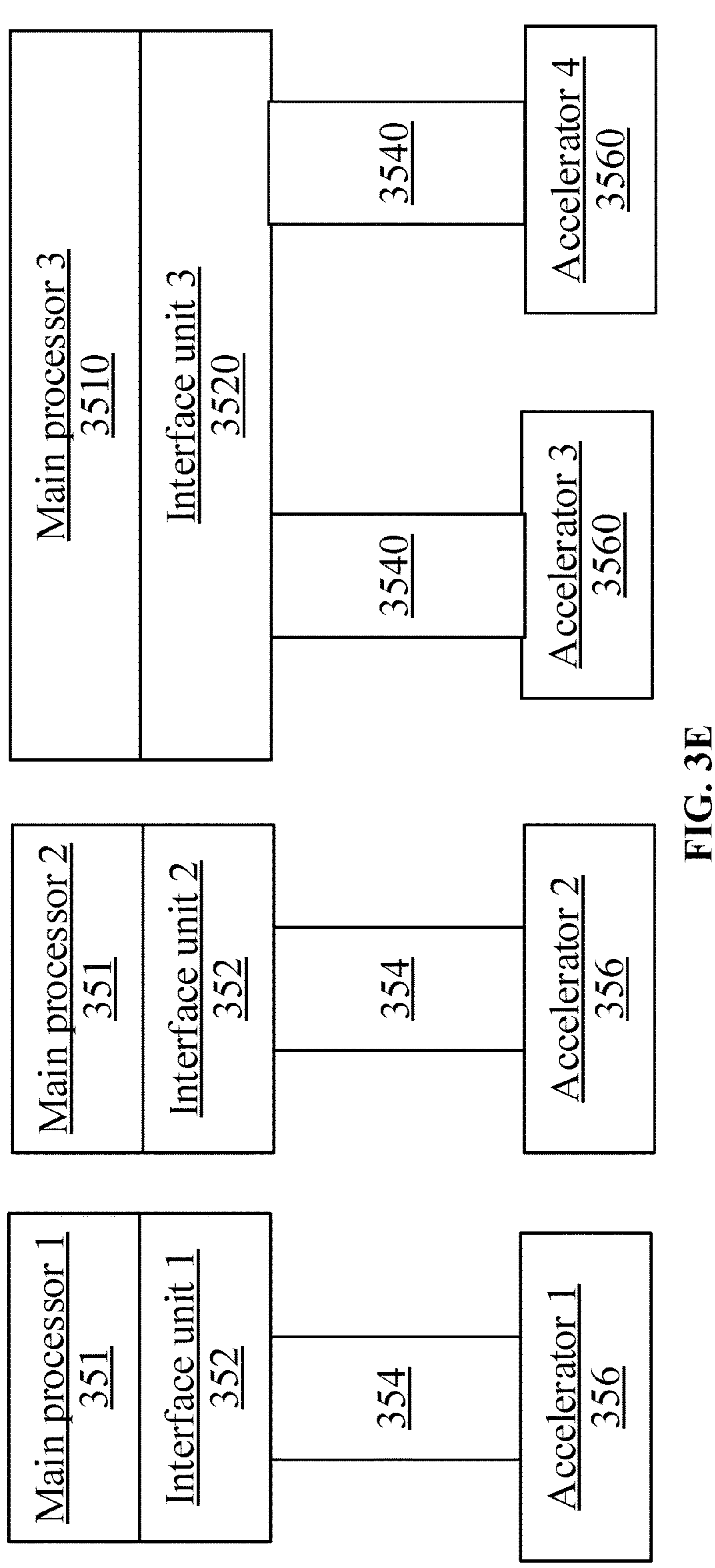

Referring to FIG. 3E, the at least one main processor includes a first main processor 351 and a second main processor 3510. First main processor 351 includes a main processor 1 and a main processor 2, and second main processor 3510 includes a main processor 3. The at least one interface unit includes a first interface unit 352 and a second interface unit 3520. First interface unit 352 includes an interface unit 1 and an interface unit 2, and second interface unit 3520 includes an interface unit 3. The at least one accelerator includes a first accelerator 356 and a second accelerator 3560. First accelerator 356 includes an accelerator 1 and an accelerator 2, and second accelerator 3560 includes an accelerator 3 and an accelerator 4.

In addition, a first bus network 354 that does not include the exchanger is connected between the first interface unit and the first accelerator. A second bus network 3540 that does not include the exchanger is connected between the second interface unit and the second accelerator.

In general, the first bus network may include a first subnetwork and a second subnetwork, the at least one accelerator may include the first accelerator and the second accelerator, the interface register may be connected to the first accelerator through the first subnetwork, and may be connected to the second accelerator through the second subnetwork, and different accelerators may be connected to the same main processor in parallel through the first subnetwork and the second subnetwork, or different main processors may be connected to the accelerators through the first subnetwork and the second subnetwork. This may further improve flexibility of the architecture, so that the architecture more adapts to complex and varying AI models and tasks.

In some embodiments, the at least one main processor includes a plurality of main processors, the at least one accelerator includes a plurality of accelerators, and the first bus network includes a plurality of subnetworks. The plurality of main processors, the plurality of accelerators, and the plurality of subnetworks correspond to each other, and each of the plurality of main processors is connected to the corresponding accelerator through the corresponding subnetwork. The plurality of subnetworks further improves the flexibility of the architecture, so that the architecture more adapts to complex and varying AI models and tasks.

In the embodiments illustrating by FIGS. 2 and 3A to 3E, the main processors perform data communication with the corresponding accelerators through the interface units thereof. A specific correspondence exists between the main processors and the interface units, which can be different from a correspondence between the interface units and the accelerators. That is to say, a one-to-one correspondence exists between the interface units and the accelerators when the first bus network does not include the exchanger. When the first bus network includes the exchanger, a many-to-many correspondence may exist between the interface units and the accelerators. In other words, each interface unit may transmit data to any accelerator for processing. In case of the second bus network, the correspondence between the interface units and the accelerators may be a one-to-many correspondence or a many-to-one correspondence.

Furthermore, when the first bus network does not include the exchanger and the correspondence between the interface units and the accelerators is the many-to-one correspondence, queue management of the interface units may be performed in the queue management manner shown in FIG. 1, that is, a plurality of interface units may assign respective data to be processed to a same accelerator for processing.

When the first bus network includes the exchanger, the exchanger may perform combined management for a plurality of queues of the interface units. That is to say, output queues and input queues of the interface units are uniformly managed. When data to be processed is retrieved from an output queue of an interface unit, the data to be processed is assigned based on a current load of each accelerator (e.g., a length of a data queue waiting for processing by an accelerator). For example, the data to be processed of an interface unit can be assigned to an accelerator with a lowest current load for processing.

For example, the exchanger may further map a response to an accelerator instruction to an interface unit that generates the accelerator instruction, and the interface unit returns the response to a corresponding main processor for further instruction processing. For another example, a main processor that generates the accelerator instruction can be a scheduling processor. The accelerator instruction carries an identifier of an execution processor rather than an identifier of the scheduling processor that generates the accelerator instruction. The exchanger may map the response to the accelerator instruction to interface unit of the execution processor, and the interface unit returns the response to a corresponding execution processor for further instruction processing.

Figure 4:
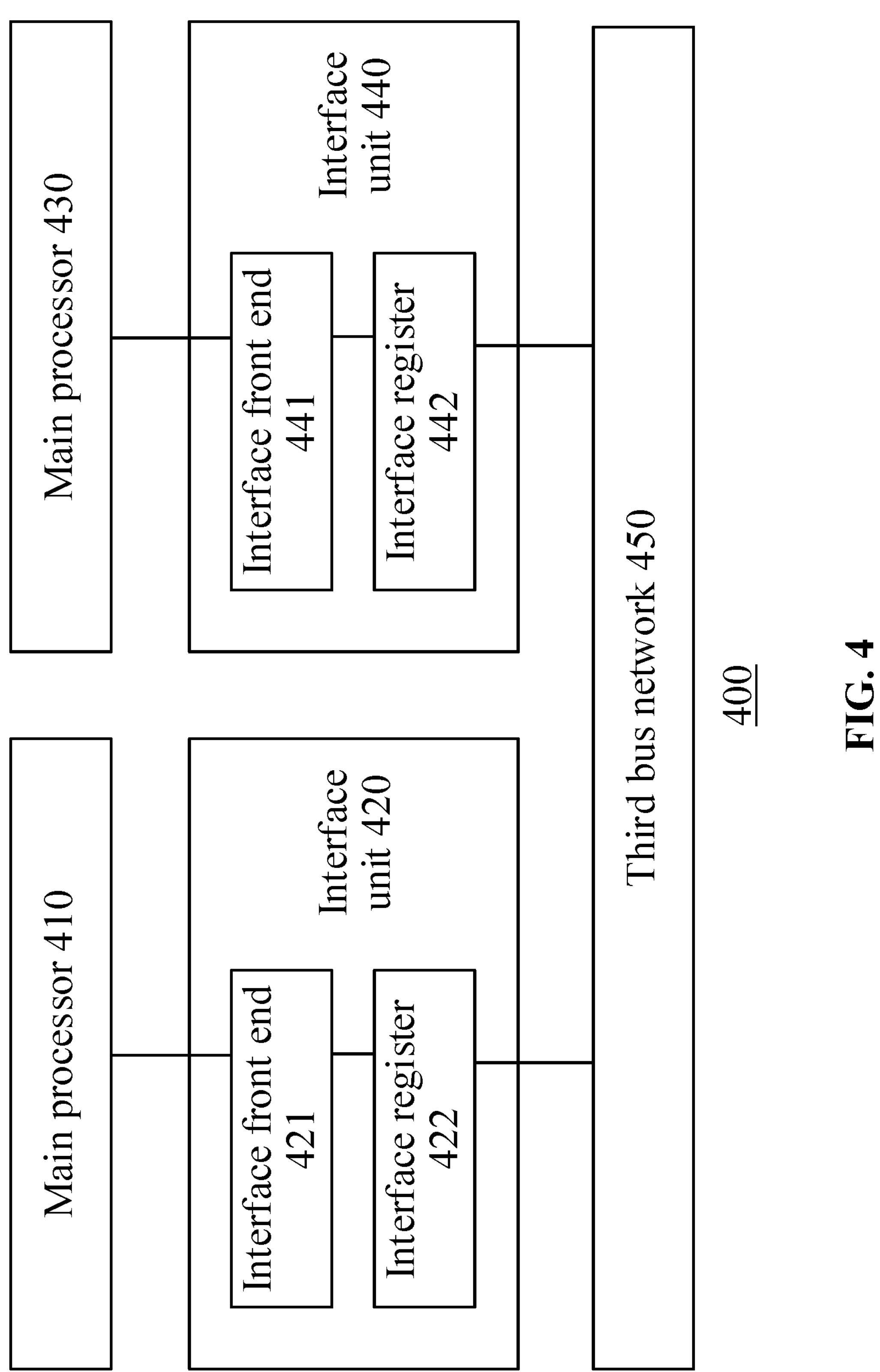
FIG. 4 is a schematic block diagram illustrating an example processing system according to some embodiments of the present disclosure.

FIG. 4 is a schematic block diagram illustrating an example processing system 400 according to some embodiments of the present disclosure. As shown in FIG. 4, processing system 400 may include a first main processor 410, a first interface unit 420, a second main processor 430, a second interface unit 440, and a third bus network 450.

First main processor 410 is configured to output a first processor instruction.

First interface unit 420 is arranged corresponding to first main processor, and first interface unit 420 includes an interface front end 421 and an interface register 422. Interface front end 421 is connected to first main processor 410, and is configured to receive the first processor instruction, to generate a transmission instruction corresponding to the first processor instruction, and to transmit the transmission instruction. Interface register 422 is configured to receive the transmitted transmission instruction and to forward the transmission instruction, or to receive a response to the transmission instruction.

Second main processor 430 is configured to at least process a second processor instruction to obtain a processing result of the second processor instruction.

Second interface unit 440 is arranged corresponding to second main processor 430, and second interface unit 440 includes an interface front end 441 and an interface register 442. Interface register 442 is configured to receive the transmitted transmission instruction and to forward the transmission instruction, or to receive a response to the transmission instruction. Interface front end 441 is connected to the second main processor, and is configured to receive the transmission instruction and generate a second processor instruction corresponding to the transmission instruction, or generate the response to the transmission instruction based on the processing result of the second processor instruction.

Third bus network 450 is connected between first main processor 410 and second main processor 420, and is configured to transmit the transmission instruction from first main processor 410 to second main processor 420, or to transmit the response to the transmission instruction from second main processor 420 to first main processor 410.

According to the processing system in some embodiments of this disclosure, the first interface unit can be arranged corresponding to the first main processor, the second interface unit can be arranged corresponding to the second main processor, instruction conversion between the first main processor and the second main processor can be implemented through the interface front end, and the interface register can be configured to forward the converted instruction, which facilitates queue management of the instructions, thereby obtaining, through the interface unit, the second processor instruction suitable for processing by the second main processor. In addition, the third bus network can be connected between the first interface unit and the second interface unit, and can be configured to transmit the second processor instruction to the second main processor, or to transmit a response to the second processor instruction to a corresponding interface register. Through the third bus network, a flexible quantity of main processors may be connected through buses, so as to adapt to many types of machine learning models and artificial intelligence learning tasks. In this way, flexibility of computing capability configuration is improved.

Specifically, interface units of different main processors are connected through the third bus network. A processor instruction of a specific main processor may be converted into a format for a general-purpose processor (e.g., a transmission instruction), and then is routed through the third bus network. An interface unit of another main processor can convert the transmission instruction into a processor instruction of the another main processor and forward the processor instruction to the main processor thereof for processing.

In addition, for heterogeneous computing between each main processor and an accelerator (for example, transmission based on the first bus network or the second bus network), reference can be made to embodiments illustrating by FIGS. 2, and 3A to 3E.

FIGS. 5A, 5B, 5C and 5D are schematic block diagrams illustrating various variation examples of the processing system, according to the processing system shown in FIG. 4.

Figure 5A:
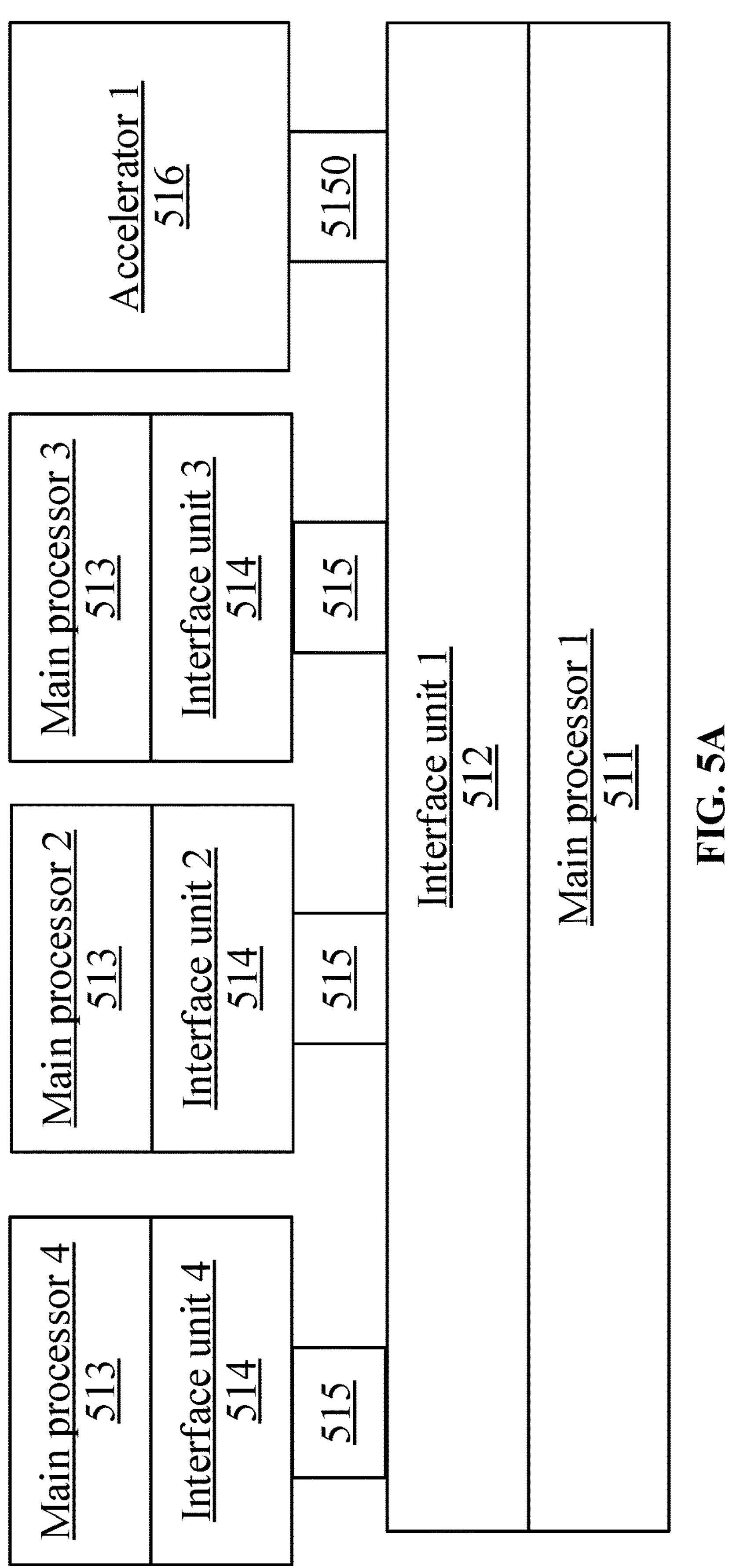
FIGS. 5A, 5B, 5C and 5D are schematic block diagrams illustrating various variation examples of the processing system, according to the processing system shown in FIG. 4.

Referring to FIG. 5A, a first main processor 511 includes a main processor 1, and a first interface unit 512 includes an interface unit 1. A second main processor 513 includes a main processor 2, a main processor 3, and a main processor 4, and a second interface unit 514 includes an interface unit 2, an interface unit 3, and an interface unit 4. The third bus network further includes a plurality of subnetworks 515, each being connected between first main processor 511 and second main processor 513. In addition, the processing system shown in FIG. 5A further includes a fourth bus network 5150 and at least one accelerator 516 (e.g., an accelerator 1).

Specifically, different main processors may assist instruction processing for each other, and the accelerator may assist instruction processing for any main processor connected thereto.

Figure 5B:
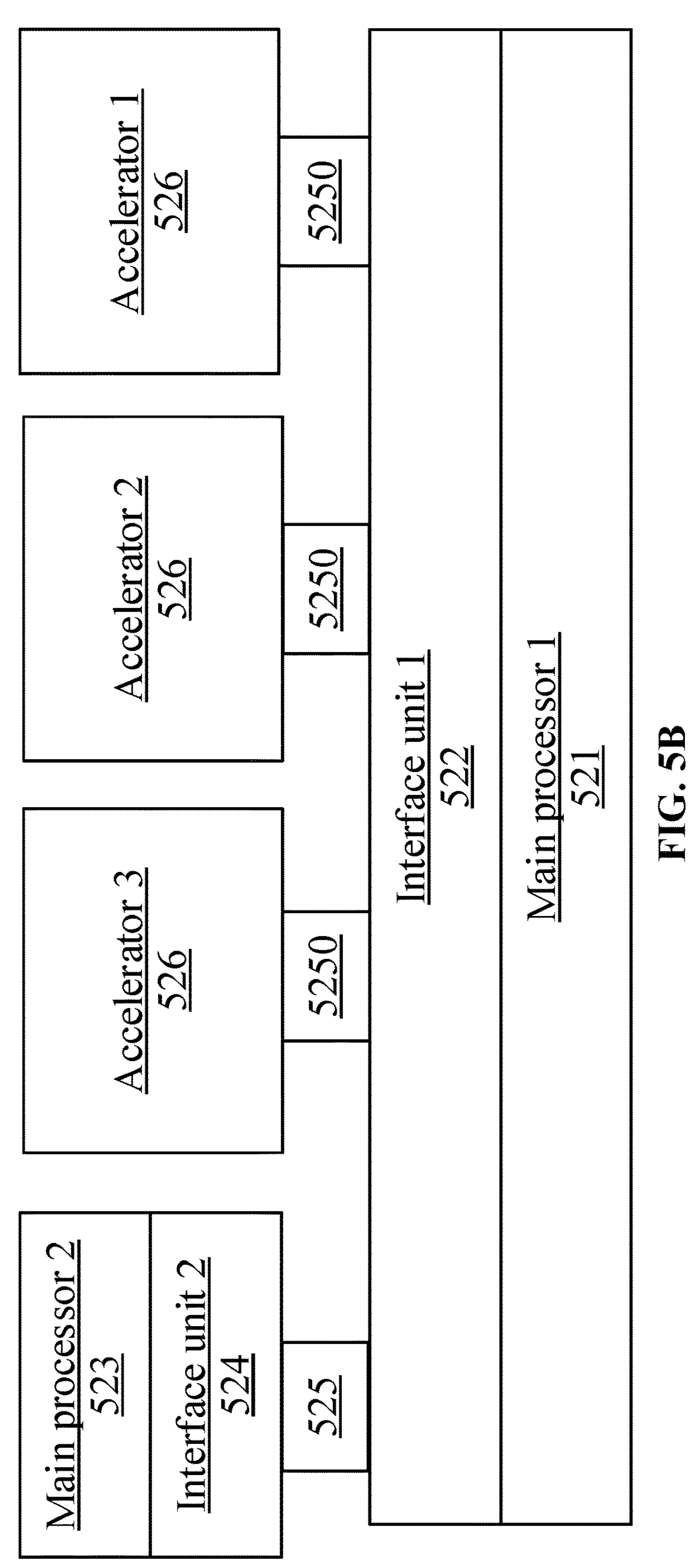

Referring to FIG. 5B, a first main processor 521 includes a main processor 1, and a first interface unit 522 includes an interface unit 1. A second main processor 523 includes a main processor 2, and a second interface unit 524 includes an interface unit 2. A third bus network 525 is connected between the interface unit 1 and the interface unit 2. In addition, a fourth bus network includes a plurality of subnetworks 5250, each being arranged between the interface unit 1 and an accelerator 526.

In general, the first main processor can be further configured to output a second processor instruction. The interface front end of the first interface unit can be further configured to receive the second processor instruction, to generate a second accelerator instruction corresponding to the second processor instruction, and to transmit the second accelerator instruction. The interface register of the first interface unit can be further configured to receive the transmitted second accelerator instruction and to forward the second accelerator instruction, or to receive a response to the second accelerator instruction. The processing system may further includes: at least one accelerator configured to process the forwarded second accelerator instruction to obtain the response to the second accelerator instruction; and a first bus network, connected between the first interface unit and the at least one accelerator and configured to transmit the second accelerator instruction to a corresponding accelerator, or to transmit the response to the second accelerator instruction to the interface register of the first interface unit. Through the first bus network, a flexible quantity of main processors may be connected to accelerators through buses, so as to adapt to many types of machine learning models and artificial intelligence learning tasks. In this way, flexibility of computing capability configuration can be improved.

Figure 5C:
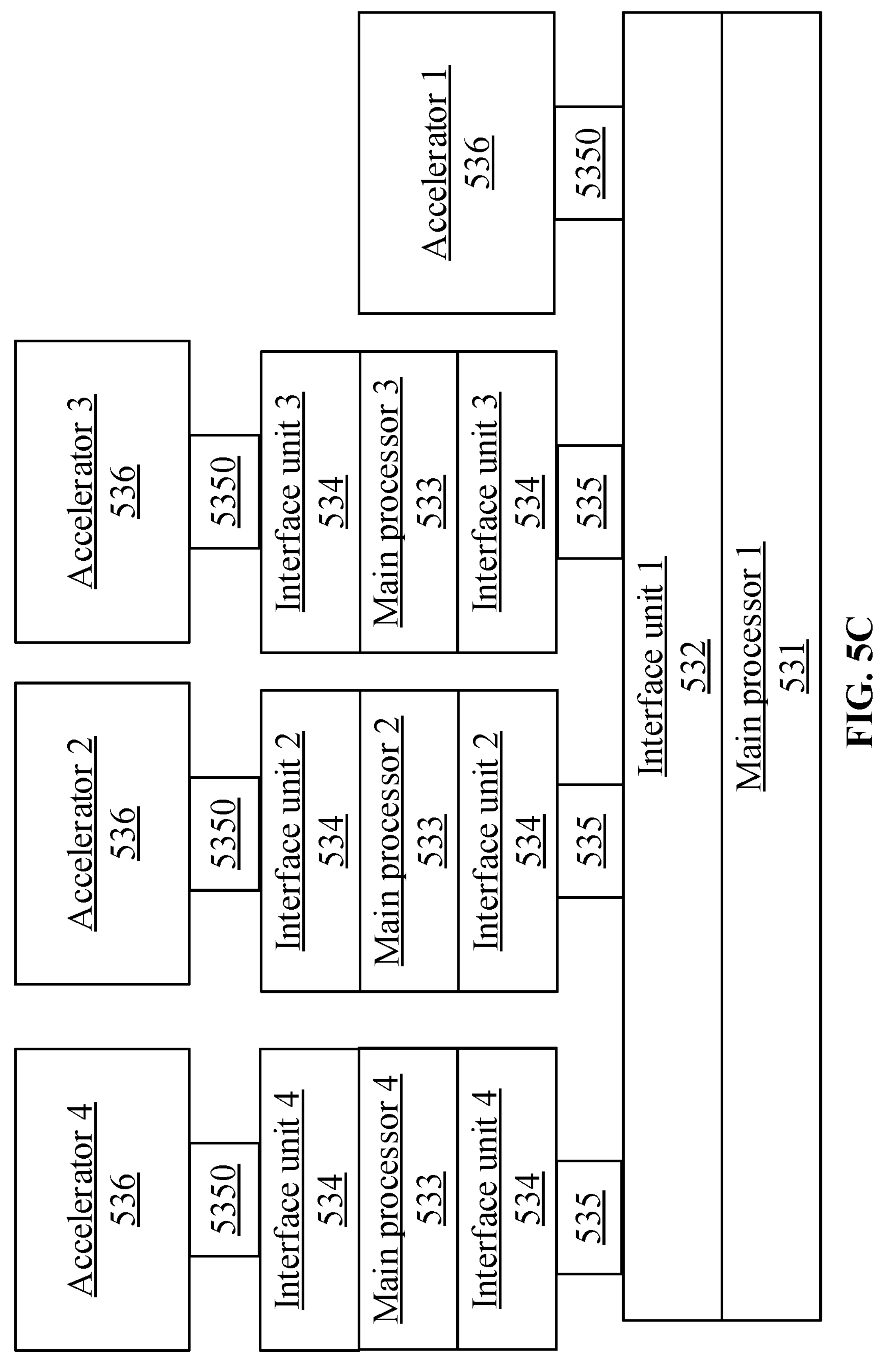

Referring to FIG. 5C, a first main processor 531 includes a main processor 1, and a first interface unit 532 includes an interface unit 1. A second main processor 533 includes a main processor 2, a main processor 3, and a main processor 4, and a second interface unit 534 includes an interface unit 2, an interface unit 3, and an interface unit 4. The third bus network further includes a plurality of subnetworks 535, each being connected between first main processor 531 and second main processor 533. In addition, the processing system shown in FIG. 5C may further include a fourth bus network 5350 and at least one accelerator 536 (e.g., an accelerator 1). Subnetworks 5350 are respectively connected between an accelerator 2 and the interface unit 2, between an accelerator 3 and the interface unit 3, and between an accelerator 4 and the interface unit 4.

In general, the second main processor can be further configured to output a third processor instruction. The interface front end of the second interface unit can be further configured to receive the third processor instruction, to generate a third accelerator instruction corresponding to the third processor instruction, and to transmit the third accelerator instruction. The interface register of the second interface unit can be further configured to receive the transmitted third accelerator instruction and to forward the third accelerator instruction, or to receive a response to the third accelerator instruction. In addition, the processing system may further include: at least one accelerator configured to process the forwarded third accelerator instruction to obtain the response to the third accelerator instruction; and the fourth bus network, connected between the second interface unit and the at least one accelerator and configured to transmit the third accelerator instruction to a corresponding accelerator, or to transmit the response to the third accelerator instruction to the interface register of the second interface unit. Through the fourth bus network, a flexible quantity of main processors may be connected to accelerators through buses, so as to adapt to many types of machine learning models and artificial intelligence learning tasks. In this way, flexibility of computing capability configuration can be improved.

Specifically, the interface unit can perform corresponding instruction conversion based on a bus network connected thereto. For example, when connected to an accelerator, the interface unit can perform conversion between the processor instruction of the main processor and the accelerator instruction. When connected to another main processor, the interface unit can perform processor instruction conversion between the main processor and the another main processor.

Figure 5D:
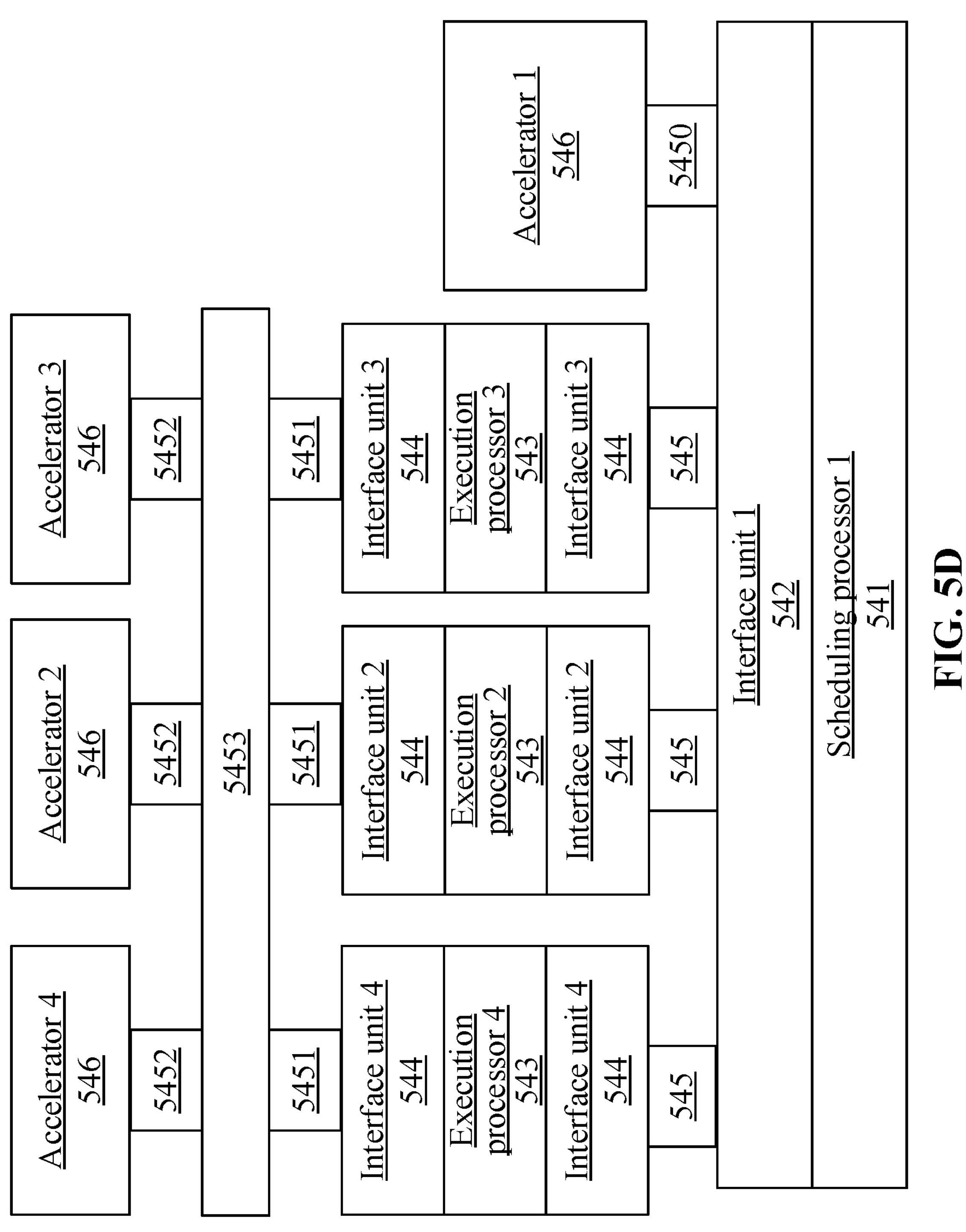

Referring to FIG. 5D, a first main processor 541 includes a scheduling processor 1, and a first interface unit 542 includes an interface unit 1. A second main processor 543 includes an execution processor 2, an execution processor 3, and an execution processor 4, and a second interface unit 544 includes an interface unit 2, an interface unit 3, and an interface unit 4. The third bus network further includes a plurality of subnetworks 545, each being connected between the scheduling processor 541 and the execution processor 543. In addition, the processing system shown in FIG. 5D further includes a fourth bus network 5450 and at least one accelerator 546 (e.g., an accelerator 1). Subnetworks 545 are respectively connected between an accelerator 2 and the interface unit 2, between an accelerator 3 and the interface unit 3, and between an accelerator 4 and the interface unit 4.

Furthermore, when the first main processor is the scheduling processor and the second main processor is the execution processor, the scheduling processor reads an instruction from a main memory, and converts the read instruction into an execution instruction for processing by the execution processor, and the accelerators execute the instruction received from the execution processor or the scheduling processor.

Figure 6:
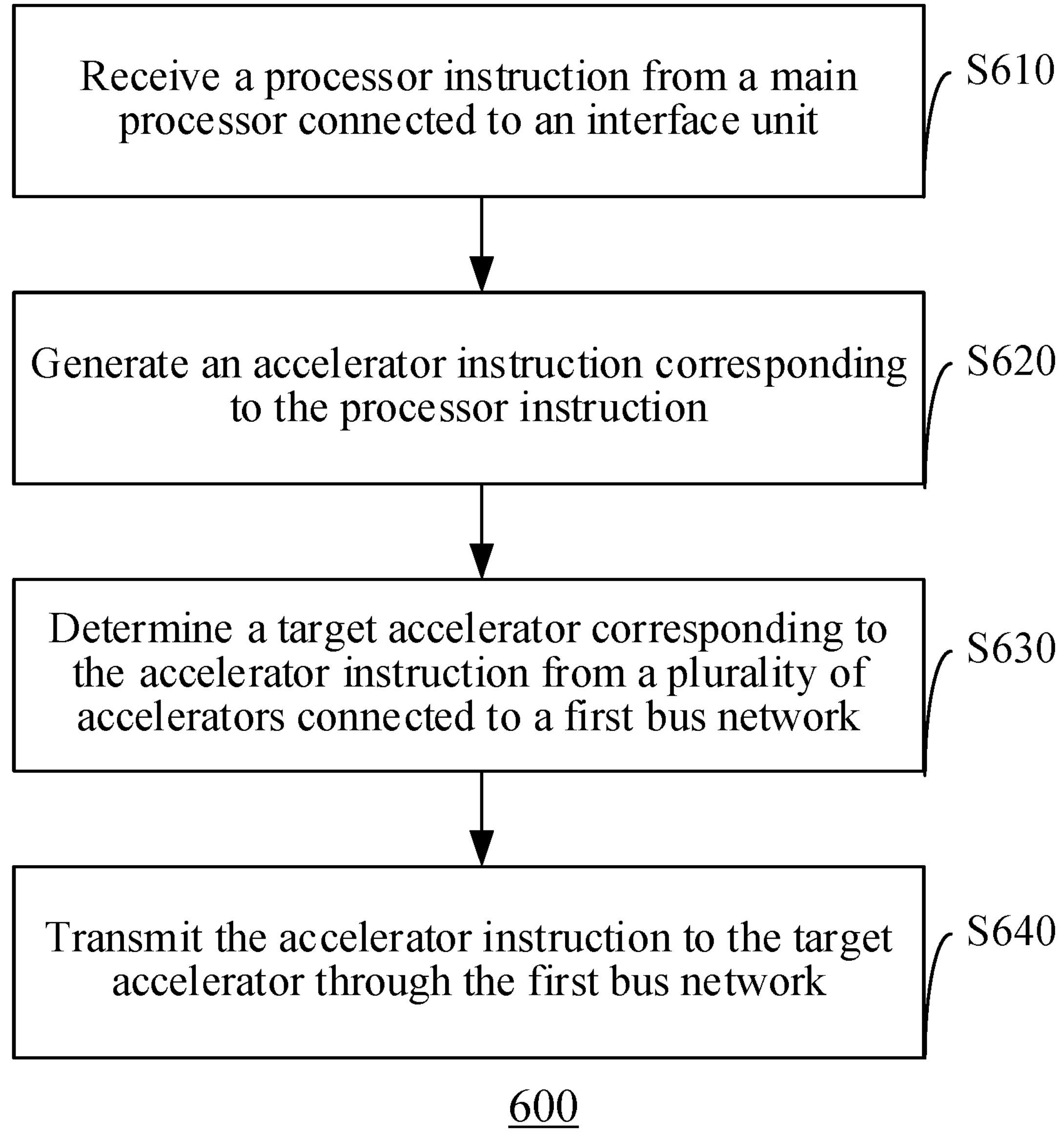
FIG. 6 is a flowchart of steps illustrating an instruction transmission method according to some embodiments of the present disclosure.

FIG. 6 is a flowchart illustrating an example instruction transmission method 600 according to some embodiments of the present disclosure. Instruction transmission method 600 in some embodiments can be applicable to an interface unit (e.g., any of interface units shown in FIGS. 2, 3A to 3E, 4, and 5A to 5D). The interface unit may be the interface unit in any of the above embodiments. As shown in FIG. 6, instruction transmission method 600 includes the following steps S610 to S640.

In step S610, the interface unit receives a processor instruction from a main processor connected to the interface unit.

In step S620, the interface unit generates an accelerator instruction corresponding to the processor instruction.

In step S630, the interface unit determines a target accelerator corresponding to the accelerator instruction from a plurality of accelerators connected to a first bus network.

In step S640, the interface unit transmits the accelerator instruction to the target accelerator through the first bus network.

According to the instruction transmission method in some embodiments of this disclosure, the first bus network implements a flexible correspondence between the interface units of the main processors and the accelerator, which may improve flexibility of instruction scheduling, thereby achieving acceleration efficiency of the accelerators.

In some embodiments, step S630 of determining the target accelerator corresponding to the accelerator instruction from the plurality of accelerators connected to the first bus network may include: determining a quantity of instructions to be processed of each of the plurality of accelerators connected to the first bus network; and determining, from the plurality of accelerators, a target accelerator of which a quantity of instructions to be processed is less than a quantity of instructions to be processed of other accelerators. In some embodiments, the quantity of the instructions to be processed of the target accelerator is less than the quantity of the instructions to be processed of the other accelerators, thereby further improving the overall acceleration efficiency of the accelerators.

In some embodiments, step S640 of transmitting the accelerator instruction to the target accelerator through the first bus network may include: transmitting the accelerator instruction and an identifier of the target accelerator to an exchanger of the first bus network through a bus front end of the first bus network corresponding to the interface unit, where the identifier instructs the exchanger to locate the target accelerator; and forwarding the accelerator instruction to the target accelerator. In some embodiments, through the exchanger of in the first bus network, more flexible instruction forwarding is implemented.

In some embodiments, instruction transmission method 600 may further include (not shown in FIG. 6): receiving, through the first bus network, a processing response to the accelerator instruction returned by the target accelerator. In some embodiments, the first bus network transmits the accelerator instruction and receives the processing response to the accelerator instruction, which improves the efficiency of instruction transmission, and reduces transmission costs.

Figure 7:
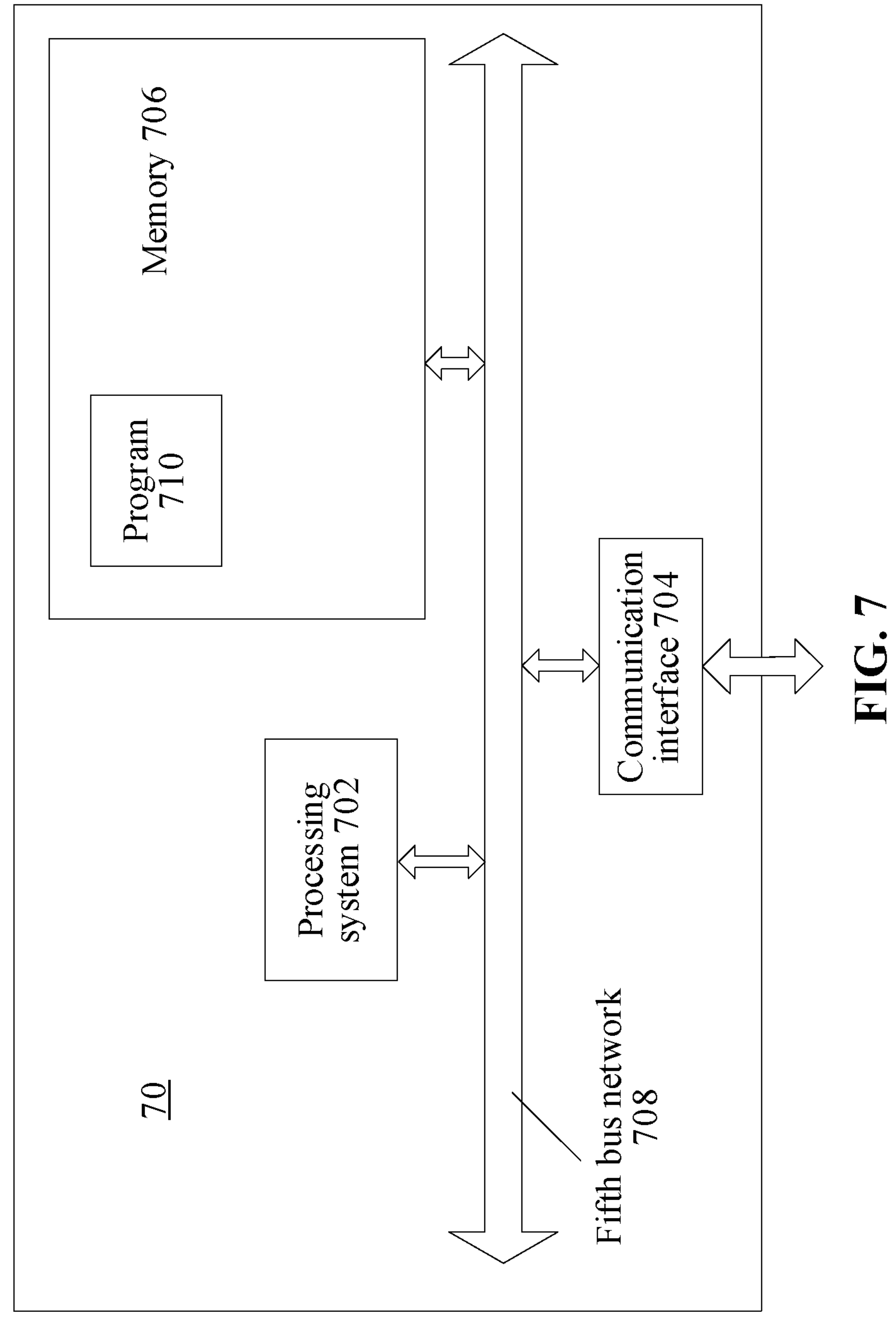
FIG. 7 is a schematic structural diagram illustrating an example electronic device according to some embodiments of the present disclosure.

FIG. 7 is a schematic structural diagram illustrating an example electronic device 70 according to some embodiments of the present disclosure. As appreciated, the electronic device is not limited by the specific embodiments as illustrated by FIG. 7.

As shown in FIG. 7, electronic device 70 may include a processing system 702, a communication interface 704, a memory 706, and a fifth bus network 708. The fifth bus network 708 may be an internal bus network, and the fifth bus network may be the same as or different from the first bus network.

Processing system 702, communication interface 704, and memory 706 complete communication with each other through fifth bus network 708. Communication interface 704 is configured to communicate with another electronic device or a server.

Processing system 702 is configured to execute a program 710, and specifically may execute the related steps in any of the methods described above.

Specifically, program 710 may include program code. The program code includes computer operating instructions.

Processing system 702 may be a central processing unit (CPU), a graphics processing unit (GPU), an infrastructure processing unit (IPU), a neural processing unit (NPU), an application specific integrated circuit (ASIC), any combination thereof, or one or more integrated circuits configured to implement the embodiments of the present disclosure. One or more processors included in an electronic device may be a same type of processor, such as one or more CPUs, or may be different types of processors, such as one or more CPUs and one or more ASICs.

Memory 706 is configured to store program 710. Memory 706 may include a high-speed random access memory (RAM), and may further include a non-volatile memory, such as at least one disk memory.

Program 710 may be specifically configured to enable a receiving unit of processing system 702 to perform instruction transmission method 600 shown in FIG. 6, for example.

In addition, for specific implementation of steps in program 710 stored in the memory, refer to the corresponding description in the corresponding steps and units in the above embodiments. Details are not described herein. It is appreciated that, for ease and brevity of description, for a specific working process of the device and the module described above, refer to the description of the corresponding process in any of the methods described above. Details are not described herein.

In addition, some embodiments of the present disclosure further provide a non-transitory computer-readable storage medium, storing a computer program. The program is executable by the processing system in the above embodiments.

It is to be noted that, based on requirements of implementation, the components/steps described in the embodiments of this disclosure may be split into more components/steps, or two or more components/steps or partial operations of the components/steps may be combined into new components/steps to achieve the goal of the embodiments of this disclosure.

The above methods in the embodiments of this disclosure may be implemented in hardware or firmware, or may be implemented as software or computer code that may be stored in a recording medium (such as a CD ROM, a RAM, a floppy disk, a hard disk, or a magneto-optical disk), or may be implemented as computer code downloaded through a network and originally stored in a remote recording medium or a non-transitory machine-readable medium and will be stored in a local recording medium. Therefore, the methods described herein may be processed by software stored in a recording medium using a general-purpose computer, a dedicated processor, or programmable or dedicated hardware (such as an ASIC or a field programmable gate array (FPGA)). It may be understood that a computer, a processor, a microprocessor controller, or programmable hardware includes a storage component (such as a RAM, a read-only memory (ROM), or a flash memory) that may store or receive software or computer code. When the software or the computer code is accessed and executed by the computer, the processor, or the hardware, the methods described herein are implemented. Furthermore, when the general-purpose computer accesses the code for implementing the methods shown herein, execution of the code converts the general-purpose computer into a dedicated computer configured to perform the methods shown herein.

It is appreciated that the units and the steps of the methods in the examples described with reference to the embodiments disclosed herein may be implemented by electronic hardware or a combination of computer software and electronic hardware. Whether the functions are performed by hardware or software depends on particular applications and design constraints of the technical solutions. It is appreciated that different methods may be used to implement the described functions for each particular application, but it should not be considered that the implementation goes beyond the scope of the embodiments of this disclosure.

The embodiments may further be described using the following clauses:

1. A processing system, including:
   - at least one main processor configured to output a processor instruction;
   - at least one interface unit arranged corresponding to the at least one main processor and including:
     - an interface front end communicatively coupled to the main processor and configured to receive the processor instruction, to generate an accelerator instruction corresponding to the processor instruction, and to transmit the accelerator instruction; and
     - an interface register configured to receive the transmitted accelerator instruction and to forward the accelerator instruction, or to receive a response to the accelerator instruction;
   - at least one accelerator configured to process the forwarded accelerator instruction to obtain the response to the accelerator instruction; and
   - a first bus network, connected between the at least one interface unit and the at least one accelerator and configured to transmit the accelerator instruction to a corresponding accelerator of the at least one accelerator, or to transmit the response to the accelerator instruction to a corresponding interface register.

2. The processing system according to clause 1, wherein the first bus network includes at least one bus front end and at least one bus back end, the at least one bus front end is arranged corresponding to at least one interface register, and the at least one bus back end is arranged corresponding to the at least one accelerator; and
   - wherein the first bus network is configured to transmit the accelerator instruction to the corresponding accelerator or to transmit the response to the accelerator instruction to the corresponding interface register through routing between the at least one bus front end and the at least one bus back end.

3. The processing system according to clause 2, wherein the first bus network includes an exchanger, and the exchanger is arranged between the at least one bus front end and the at least one bus back end, and is configured to route the accelerator instruction or the response to the accelerator instruction between the at least one bus front end and the at least one bus back end.

4. The processing system according to clause 2 or 3, wherein the first bus network includes a first subnetwork and a second subnetwork, the at least one main processor includes a first main processor and a second main processor, and the at least one interface unit includes a first interface unit arranged corresponding to the first main processor and a second interface unit arranged corresponding to the second main processor; and wherein an interface register of the first interface unit is communicatively coupled to the at least one accelerator through the first subnetwork, and an interface register of the second interface unit is communicatively coupled to the at least one accelerator through the second subnetwork.

5. The processing system according to any of clauses 2 to 4, wherein the first bus network includes a first subnetwork and a second subnetwork, and the at least one accelerator includes a first accelerator and a second accelerator; and wherein the interface register is communicatively coupled to the first accelerator through the first subnetwork, and is communicatively coupled to the second accelerator through the second subnetwork.

6. The processing system according to any of clauses 2 to 5, wherein the at least one main processor includes a plurality of main processors, the at least one accelerator includes a plurality of accelerators, and the first bus network includes a plurality of subnetworks; and wherein the plurality of main processors, the plurality of accelerators, and the plurality of subnetworks correspond to each other respectively, and each of the plurality of main processors is communicatively coupled to the corresponding accelerator through a corresponding subnetwork.

7. A processing system, including:

a first main processor configured to output a first processor instruction;

a first interface unit arranged corresponding to the first main processor and including:

a first interface front end communicatively coupled to the first main processor and configured to receive the first processor instruction, to generate a transmission instruction corresponding to the first processor instruction, and to transmit the transmission instruction; and a first interface register configured to receive the transmitted transmission instruction and to forward the transmission instruction, or to receive a response to the transmission instruction;

a second main processor configured to at least process a second processor instruction to obtain a processing result of the second processor instruction;

a second interface unit arranged corresponding to the second main processor and including:

a second interface register configured to receive the transmitted transmission instruction and to forward the transmission instruction, or to receive the response to the transmission instruction;

a second interface front end communicatively coupled to the second main processor and configured to receive the transmission instruction and generate a second processor instruction corresponding to the transmission instruction, or generate the response to the transmission instruction based on the processing result of the second processor instruction; and a third bus network, connected between the first main processor and the second main processor and configured to transmit the transmission instruction from the first main processor to the second main processor, or to transmit the response to the transmission instruction from the second main processor to the first main processor.

8. The processing system according to clause 7, wherein the first main processor is further configured to output the second processor instruction;

the first interface front end is further configured to receive the second processor instruction, to generate a second accelerator instruction corresponding to the second processor instruction, and to transmit the second accelerator instruction;

the first interface register is further configured to receive the transmitted second accelerator instruction and to forward the second accelerator instruction, or to receive a response to the second accelerator instruction; and the processing system further includes:

at least one accelerator configured to process the forwarded second accelerator instruction to obtain the response to the second accelerator instruction; and a first bus network, connected between the first interface unit and the at least one accelerator and configured to transmit the second accelerator instruction to a corresponding accelerator, or to transmit the response to the second accelerator instruction to the first interface register.

9. The processing system according to clause 7 or 8, wherein the second main processor is further configured to output a third processor instruction;

the second interface front end is further configured to receive the third processor instruction, to generate a third accelerator instruction corresponding to the third processor instruction, and to transmit the third accelerator instruction;

the second interface register is further configured to receive the transmitted third accelerator instruction and to forward the third accelerator instruction, or to receive a response to the third accelerator instruction; and the processing system further includes:

at least one accelerator configured to process the forwarded third accelerator instruction to obtain the response to the third accelerator instruction; and a fourth bus network, connected between the second interface unit and the at least one accelerator and configured to transmit the third accelerator instruction to a corresponding accelerator, or to transmit the response to the third accelerator instruction to the second interface register.

10. The processing system according to any of clauses 7 to 9, wherein the first main processor is a scheduling processor, and the second main processor is an execution processor.

11. An instruction transmission method, including:

receiving a processor instruction from a main processor communicatively coupled to an interface unit;

generating an accelerator instruction corresponding to the processor instruction;

determining a target accelerator corresponding to the accelerator instruction from a plurality of accelerators communicatively coupled to a first bus network; and transmitting the accelerator instruction to the target accelerator through the first bus network.

12. The method according to clause 11, wherein determining the target accelerator corresponding to the accelerator instruction from the plurality of accelerators communicatively coupled to the first bus network includes:

determining a quantity of instructions to be processed of each of the plurality of accelerators communicatively coupled to the first bus network; and determining, from the plurality of accelerators, a target accelerator of which a quantity of instructions to be processed is less than a quantity of instructions to be processed of other accelerators.

13. The method according to clause 11 or 12, wherein transmitting the accelerator instruction to the target accelerator through the first bus network includes:

transmitting the accelerator instruction and an identifier of the target accelerator to an exchanger of the first bus network through a bus front end of the first bus network corresponding to the interface unit, where the identifier instructs the exchanger to locate the target accelerator; and forwarding the accelerator instruction to the target accelerator.

14. The method according to any of clauses 11 to 13, further including:

receiving, through the first bus network, a processing response to the accelerator instruction returned by the target accelerator.

15. An electronic device, including:

a processing system, a memory, a communication interface, and a fifth bus network, wherein the processing system, the memory, and the communication interface are configured to complete communication with each other through the fifth bus network, the memory is configured to store at least one executable instruction of a computer program, and the main processor of the processing system is configured to generate a processor instruction based on the at least one executable instruction, wherein the processing system includes:

at least one main processor configured to output a processor instruction;

at least one interface unit arranged corresponding to the at least one main processor and including:

an interface front end communicatively coupled to the main processor and configured to receive the processor instruction, to generate an accelerator instruction corresponding to the processor instruction, and to transmit the accelerator instruction; and an interface register configured to receive the transmitted accelerator instruction and to forward the accelerator instruction, or to receive a response to the accelerator instruction;

at least one accelerator configured to process the forwarded accelerator instruction to obtain the response to the accelerator instruction; and a first bus network, connected between the at least one interface unit and the at least one accelerator and configured to transmit the accelerator instruction to a corresponding accelerator of the at least one accelerator, or to transmit the response to the accelerator instruction to a corresponding interface register.

16. The device according to clause 15, wherein the first bus network includes at least one bus front end and at least one bus back end, the at least one bus front end is arranged corresponding to at least one interface register, and the at least one bus back end is arranged corresponding to the at least one accelerator; and wherein the first bus network is configured to transmit the accelerator instruction to the corresponding accelerator or to transmit the response to the accelerator instruction to the corresponding interface register through routing between the at least one bus front end and the at least one bus back end.

17. The device according to clause 16, wherein the first bus network includes an exchanger, and the exchanger is arranged between the at least one bus front end and the at least one bus back end, and is configured to route the accelerator instruction or the response to the accelerator instruction between the at least one bus front end and the at least one bus back end.

18. The device according to clause 16 or 17, wherein the first bus network includes a first subnetwork and a second subnetwork, the at least one main processor includes a first main processor and a second main processor, and the at least one interface unit includes a first interface unit arranged corresponding to the first main processor and a second interface unit arranged corresponding to the second main processor; and wherein an interface register of the first interface unit is communicatively coupled to the at least one accelerator through the first subnetwork, and an interface register of the second interface unit is communicatively coupled to the at least one accelerator through the second subnetwork.

19. The device according to any of clauses 16 to 18, wherein the first bus network includes a first subnetwork and a second subnetwork, and the at least one accelerator includes a first accelerator and a second accelerator; and wherein the interface register is communicatively coupled to the first accelerator through the first subnetwork, and is communicatively coupled to the second accelerator through the second subnetwork.

20. The device according to any of clauses 16 to 19, wherein the at least one main processor includes a plurality of main processors, the at least one accelerator includes a plurality of accelerators, and the first bus network includes a plurality of subnetworks; and wherein the plurality of main processors, the plurality of accelerators, and the plurality of subnetworks correspond to each other respectively, and each of the plurality of main processors is communicatively coupled to the corresponding accelerator through a corresponding subnetwork.

21. An electronic device, including:

a processing system, a memory, a communication interface, and a fifth bus network, wherein the processing system, the memory, and the communication interface are configured to complete communication with each other through the fifth bus network, the memory is configured to store at least one executable instruction of a computer program, and the main processor of the processing system is configured to generate a processor instruction based on the at least one executable instruction, wherein the processing system includes:

a first main processor configured to output a first processor instruction;

a first interface unit arranged corresponding to the first main processor and including:

a first interface front end communicatively coupled to the first main processor and configured to receive the first processor instruction, to generate a transmission instruction corresponding to the first processor instruction, and to transmit the transmission instruction; and a first interface register configured to receive the transmitted transmission instruction and to forward the transmission instruction, or to receive a response to the transmission instruction;

a second main processor configured to at least process a second processor instruction to obtain a processing result of the second processor instruction;

a second interface unit arranged corresponding to the second main processor and including:

a second interface register configured to receive the transmitted transmission instruction and to forward the transmission instruction, or to receive the response to the transmission instruction;

a second interface front end communicatively coupled to the second main processor and configured to receive the transmission instruction and generate a second processor instruction corresponding to the transmission instruction, or generate the response to the transmission instruction based on the processing result of the second processor instruction; and a third bus network, connected between the first main processor and the second main processor and configured to transmit the transmission instruction from the first main processor to the second main processor, or to transmit the response to the transmission instruction from the second main processor to the first main processor.

22. The device according to clause 21, wherein the first main processor is further configured to output the second processor instruction;

the first interface front end is further configured to receive the second processor instruction, to generate a second accelerator instruction corresponding to the second processor instruction, and to transmit the second accelerator instruction;

the first interface register is further configured to receive the transmitted second accelerator instruction and to forward the second accelerator instruction, or to receive a response to the second accelerator instruction; and the processing system further includes:

at least one accelerator configured to process the forwarded second accelerator instruction to obtain the response to the second accelerator instruction; and a first bus network, connected between the first interface unit and the at least one accelerator and configured to transmit the second accelerator instruction to a corresponding accelerator, or to transmit the response to the second accelerator instruction to the first interface register.

23. The device according to clause 21 or 22, wherein the second main processor is further configured to output a third processor instruction;

the second interface front end is further configured to receive the third processor instruction, to generate a third accelerator instruction corresponding to the third processor instruction, and to transmit the third accelerator instruction;

the second interface register is further configured to receive the transmitted third accelerator instruction and to forward the third accelerator instruction, or to receive a response to the third accelerator instruction; and the processing system further includes:

at least one accelerator configured to process the forwarded third accelerator instruction to obtain the response to the third accelerator instruction; and a fourth bus network, connected between the second interface unit and the at least one accelerator and configured to transmit the third accelerator instruction to a corresponding accelerator, or to transmit the response to the third accelerator instruction to the second interface register.

24. The device according to any of clauses 21 to 23, wherein the first main processor is a scheduling processor, and the second main processor is an execution processor.

25. A non-transitory computer-readable storage medium storing instructions, when executed by the processing system according to any of clauses 1 to 10, cause the processing system to perform the method according to any of clauses 11 to 14.

It is to be noted that, the terms such as "first" and "second" in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms "include", "have" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is to be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution described in some embodiments of the present disclosure.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A processing system, comprising:

at least one main processor configured to output a processor instruction;

at least one interface unit arranged corresponding to the at least one main processor and comprising:

an interface front end communicatively coupled to the main processor and configured to receive the processor instruction, to generate an accelerator instruction corresponding to the processor instruction, and to transmit the accelerator instruction; and an interface register configured to receive the transmitted accelerator instruction and to forward the accelerator instruction, or to receive a response to the accelerator instruction;

at least one accelerator configured to process the forwarded accelerator instruction to obtain the response to the accelerator instruction; and a first bus network communicatively coupled between the at least one interface unit and the at least one accelerator and configured to transmit the accelerator instruction to a corresponding accelerator of the at least one accelerator, or to transmit the response to the accelerator instruction to the interface register.

2. The processing system according to claim 1, wherein the first bus network comprises at least one bus front end and at least one bus back end, the at least one bus front end is arranged corresponding to at least one interface register, and the at least one bus back end is arranged corresponding to the at least one accelerator; and wherein the first bus network is configured to transmit the accelerator instruction to the corresponding accelerator or to transmit the response to the accelerator instruction to a corresponding interface register of the at least one interface register through routing between the at least one bus front end and the at least one bus back end.

3. The processing system according to claim 2, wherein the first bus network comprises an exchanger, and the exchanger is arranged between the at least one bus front end and the at least one bus back end, and is configured to route the accelerator instruction or the response to the accelerator instruction between the at least one bus front end and the at least one bus back end.

4. The processing system according to claim 2, wherein the first bus network comprises a first subnetwork and a second subnetwork, the at least one main processor comprises a first main processor and a second main processor, and the at least one interface unit comprises a first interface unit arranged corresponding to the first main processor and a second interface unit arranged corresponding to the second main processor; and wherein an interface register of the first interface unit is communicatively coupled to the at least one accelerator through the first subnetwork, and an interface register of the second interface unit is communicatively coupled to the at least one accelerator through the second subnetwork.

5. The processing system according to claim 2, wherein the first bus network comprises a first subnetwork and a second subnetwork, and the at least one accelerator comprises a first accelerator and a second accelerator; and wherein the interface register is communicatively coupled to the first accelerator through the first subnetwork, and is communicatively coupled to the second accelerator through the second subnetwork.

6. The processing system according to claim 2, wherein the at least one main processor comprises a plurality of main processors, the at least one accelerator comprises a plurality of accelerators, and the first bus network comprises a plurality of subnetworks; and wherein the plurality of main processors, the plurality of accelerators, and the plurality of subnetworks correspond to each other respectively, and each of the plurality of main processors is communicatively coupled to the corresponding accelerator through a corresponding subnetwork of the plurality of subnetworks.

7. An instruction transmission method, comprising:

receiving a processor instruction from a main processor communicatively coupled to an interface unit;

generating an accelerator instruction corresponding to the processor instruction;

determining a target accelerator corresponding to the accelerator instruction from a plurality of accelerators communicatively coupled to a first bus network; and transmitting the accelerator instruction to the target accelerator through the first bus network.

8. The method according to claim 7, wherein determining the target accelerator corresponding to the accelerator instruction from the plurality of accelerators communicatively coupled to the first bus network comprises:

determining a quantity of instructions to be processed of each of the plurality of accelerators communicatively coupled to the first bus network; and determining, from the plurality of accelerators, a target accelerator of which a quantity of instructions to be processed is less than a quantity of instructions to be processed of other accelerators.

9. The method according to claim 7, wherein transmitting the accelerator instruction to the target accelerator through the first bus network comprises:

transmitting the accelerator instruction and an identifier of the target accelerator to an exchanger of the first bus network through a bus front end of the first bus network corresponding to the interface unit, where the identifier instructs the exchanger to locate the target accelerator; and forwarding the accelerator instruction to the target accelerator.

10. The method according to claim 7, further comprising:

receiving, through the first bus network, a processing response to the accelerator instruction returned by the target accelerator.

11. A non-transitory computer-readable storage medium storing instructions, when executed by a processing system, cause the processing system to perform operations for transmitting an instruction, the operations comprising:

receiving a processor instruction from a main processor communicatively coupled to an interface unit;

generating an accelerator instruction corresponding to the processor instruction;

determining a target accelerator corresponding to the accelerator instruction from a plurality of accelerators communicatively coupled to a first bus network; and transmitting the accelerator instruction to the target accelerator through the first bus network.

12. The non-transitory computer-readable storage medium according to claim 11, wherein determining the target accelerator corresponding to the accelerator instruction from the plurality of accelerators communicatively coupled to the first bus network comprises:

determining a quantity of instructions to be processed of each of the plurality of accelerators communicatively coupled to the first bus network; and determining, from the plurality of accelerators, a target accelerator of which a quantity of instructions to be processed is less than a quantity of instructions to be processed of other accelerators.

13. The non-transitory computer-readable storage medium according to claim 11, wherein transmitting the accelerator instruction to the target accelerator through the first bus network comprises:

transmitting the accelerator instruction and an identifier of the target accelerator to an exchanger of the first bus network through a bus front end of the first bus network corresponding to the interface unit, where the identifier instructs the exchanger to locate the target accelerator; and forwarding the accelerator instruction to the target accelerator.

14. The non-transitory computer-readable storage medium according to claim 11, the operations further comprise:

receiving, through the first bus network, a processing response to the accelerator instruction returned by the target accelerator.

* * * * *